United States Patent
Satoh

(10) Patent No.: US 8,374,839 B2
(45) Date of Patent: Feb. 12, 2013

(54) SYSTEM FOR CREATING PARAMETER INFORMATION, SYSTEM FOR ESTIMATING YIELDS, PROGRAM AND RECORDING MEDIUM

(75) Inventor: Shuhei Satoh, Tokyo (JP)

(73) Assignee: Jedat Inc., Tokyo (JP)

( * ) Notice: Subject to any disclaimer, the term of this patent is extended or adjusted under 35 U.S.C. 154(b) by 343 days.

(21) Appl. No.: 12/632,090

(22) Filed: Dec. 7, 2009

(65) Prior Publication Data

US 2010/0153086 A1   Jun. 17, 2010

(30) Foreign Application Priority Data

Dec. 11, 2008   (JP) .................................. 2008-315252
Oct. 13, 2009   (JP) .................................. 2009-235895

(51) Int. Cl.
*G06F 7/60* (2006.01)
*G06F 17/50* (2006.01)
*G06F 9/445* (2006.01)
*G06G 7/48* (2006.01)

(52) U.S. Cl. .................... 703/14; 703/2; 703/3; 703/13; 716/56; 716/113; 716/134

(58) Field of Classification Search .................. 703/2, 3, 703/13, 14
See application file for complete search history.

(56) References Cited

U.S. PATENT DOCUMENTS

| | | | |
|---|---|---|---|
| 6,978,229 B1 * | 12/2005 | Saxena et al. | 703/4 |
| 7,111,260 B2 * | 9/2006 | Visweswariah | 716/108 |
| 7,350,171 B2 * | 3/2008 | Zhang et al. | 716/108 |
| 7,437,697 B2 * | 10/2008 | Venkateswaran et al. | 716/113 |
| 7,458,049 B1 * | 11/2008 | Tuncer et al. | 716/113 |
| 7,474,999 B2 * | 1/2009 | Scheffer | 703/14 |
| 7,480,880 B2 * | 1/2009 | Visweswariah et al. | 716/113 |
| 7,512,919 B2 * | 3/2009 | Visweswariah | 716/113 |
| 7,539,583 B2 * | 5/2009 | Fu et al. | 702/81 |
| 7,640,143 B2 * | 12/2009 | Bittner et al. | 703/2 |
| 7,650,580 B2 * | 1/2010 | Kucukcakar et al. | 716/100 |
| 7,689,954 B2 * | 3/2010 | Zhang et al. | 716/113 |
| 7,716,023 B2 * | 5/2010 | Barker et al. | 703/2 |
| 7,945,868 B2 * | 5/2011 | Pileggi et al. | 716/30 |
| 8,170,857 B2 * | 5/2012 | Joshi et al. | 703/14 |
| 8,214,169 B2 * | 7/2012 | Bhavnagarwala et al. | 702/117 |
| 2005/0043908 A1 * | 2/2005 | Bhavnagarwala et al. | 702/64 |

(Continued)

OTHER PUBLICATIONS

Singhee et al. "Recursive Statistical Blockade: An Enhanced Technique for Rare Event Simulation with Application to SRAM Circuit Design", 2007.*

(Continued)

*Primary Examiner* — Shambhavi Patel
(74) *Attorney, Agent, or Firm* — Westerman, Hattori, Daniels & Adrian, LLP

(57) ABSTRACT

The simulation information creating part 111 generates random numbers corresponding to the correlation coefficient data between the simulation model parameters, and also creates the simulation model library having correlated model parameters with variations, and the simulation net list for the objective characteristic, by Monte Carlo method using the typical simulation model library, the standard deviations for the plural simulation model parameters and the simulation net list for the typical objective characteristic. The simulation part 112 obtains samples having the objective characteristics with variations. The yield estimation part 120, estimates the yields by determining whether the samples satisfy the predetermined specification or not (Pass or Fail), wherein by repeating the determination by making the simulations again only for the samples on which the filter having the function of learning the boundary for decision of Pass or Fail did not determine as Pass.

6 Claims, 13 Drawing Sheets

U.S. PATENT DOCUMENTS

| | | | |
|---|---|---|---|
| 2005/0251771 A1* | 11/2005 | Robles | 716/5 |
| 2005/0257178 A1* | 11/2005 | Daems et al. | 716/2 |
| 2005/0278051 A1* | 12/2005 | Paik | 700/108 |
| 2006/0100873 A1* | 5/2006 | Bittner et al. | 704/256.2 |
| 2006/0107244 A1* | 5/2006 | Yonezawa | 716/4 |
| 2007/0198956 A1* | 8/2007 | Liu et al. | 716/2 |
| 2007/0234256 A1* | 10/2007 | Chang et al. | 716/6 |
| 2008/0046846 A1* | 2/2008 | Chew et al. | 716/2 |
| 2008/0307379 A1* | 12/2008 | Visweswariah | 716/6 |
| 2009/0031268 A1* | 1/2009 | Miranda et al. | 716/6 |
| 2009/0070716 A1* | 3/2009 | Joshi et al. | 716/2 |
| 2010/0287517 A1* | 11/2010 | Buss et al. | 716/6 |
| 2012/0179412 A1* | 7/2012 | Bhavnagarwala et al. | 702/117 |

OTHER PUBLICATIONS

Kanj et al. "Mixture Importance Sampling and Its Application to the Analysis of SRAM Designs in the Presence of Rare Failure Events", Jul. 2006, ACM.*

Romanescu et al. "VariaSim: Simulating Circuits and Systems in the Presence of Process Variability ", 2007.*

Wang et al. "Circuit Size Optimization with Multiple Sources of Variation and Position Dependant Correlation", Proc. of SPIE vol. 6521, 65210P, (2007).*

Lin et al. "Circuit Sensitivity to Interconnect Variation", IEEE Transactions on Semiconductor Manufacturing, vol. 11, No. 4, Nov. 1998.*

Steer, Michael. "SPICE: User's Guide and Reference", 2007.*

Mehrohtra, Vikas. "Modeling the Effects of Systematic Process Variation on Circuit Performance", 2001.*

Boning et al. "Models of Process Variations in Device and Interconnect", 2001.*

Rouwaida Kanj et al, "Mixture Importance Sampling and Its Application to the Analysis of SRAM Designs in the Presence of Rare Failure Events", Proceedings of Design Automation Conference, Jul. 2006, pp. 69-72.

Sang-Hoon Lee et al, "An Efficient Statistical Analysis Methodology and Its Application to High-Density DRAMs," IEEE/ACM Proceedings of ICCAD 1997, pp. 678-683.

Amith Singhee et al, "Recursive Statistical Blockade: An Enhanced Technique for Rare Event Stimulation with Application to SRAM Circuit Design," 21st International Conference on VLSI Design, 2008, pp. 131-136.

Kiyoshi Takeuchi et al, "A Highly Efficient Statistical Compact Model Parameter Extraction Scheme," SISPAD 2005 Proceedings, pp. 135-138, 2005.

Kiyoshi Takeuchi et al, "A Highly Efficient Statistical Compact Model Parameter Extraction Scheme," JSAP, Silicon Technology No. 76, 2005, pp. 41-45.

* cited by examiner

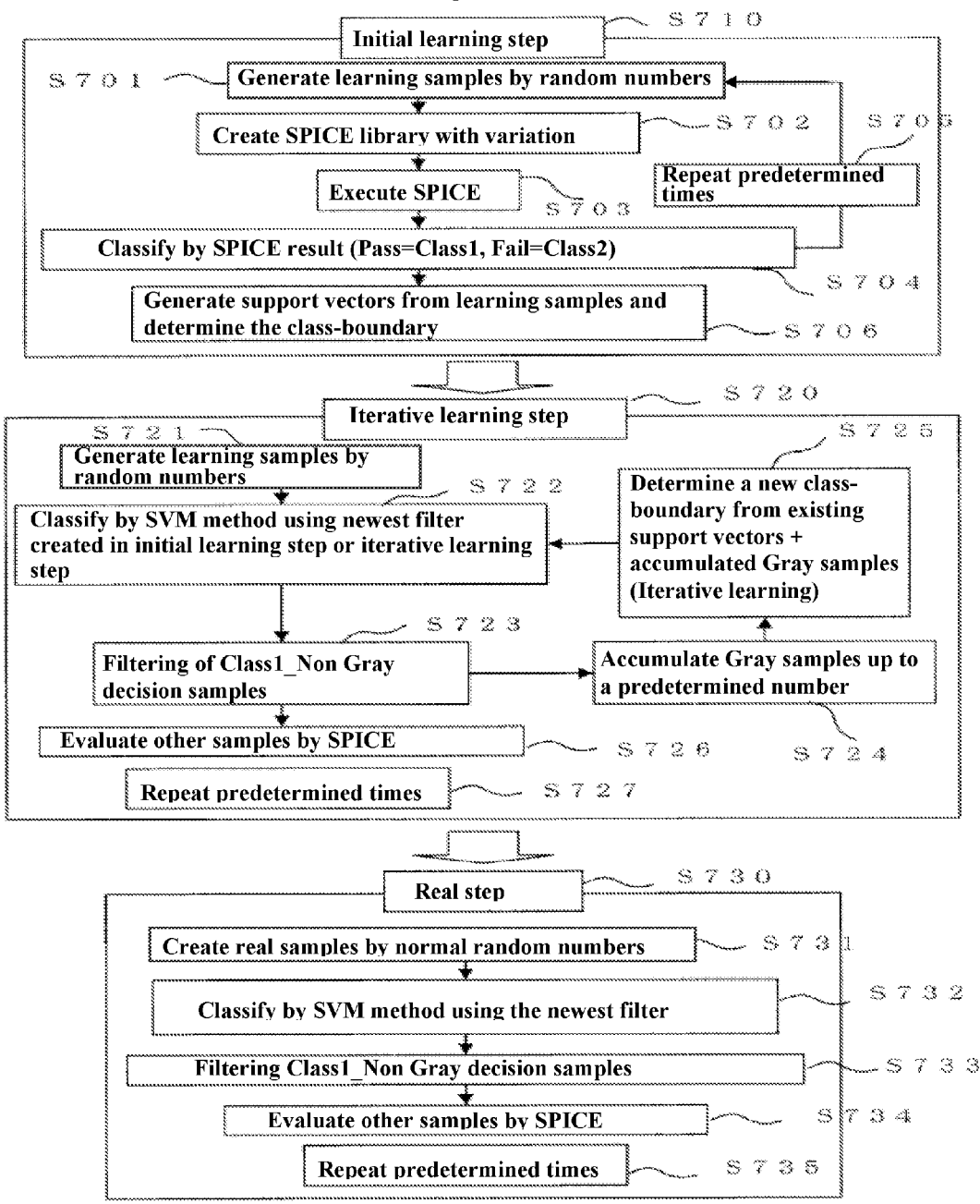

SYSTEM FOR CREATING PARAMETER INFORMATION, SYSTEM FOR ESTIMATING YIELDS, PROGRAM AND RECORDING MEDIUM

CROSS-REFERENCE TO RELATED APPLICATIONS

This application claims priority under 35 U.S.C. §119 to Japanese Patent Application No. 2008-315252, filed Dec. 11, 2008, and Japanese Patent Application No. 2009-235895, filed Oct. 13, 2009. The contents of these applications are incorporated herein by reference in their entirety.

BACKGROUND OF THE INVENTION

1. Field of Invention

The present invention relates to a system for creating parameter information that creates parameter information used in simulations of electronic circuits, a system for estimating yields that estimates yields of the electronic circuits, and to a computer program (hereafter, a program) and recording medium.

2. Background Art

Heretofore, the system for creating parameter information for use in simulation of the electronic circuits, and the system for estimating yields of the electronic circuits have been developed. Conventionally, the following three stage processes are performed in a system for estimating yields that adopted a SPICE (Simulation Program with Integrated Circuit Emphasis) which is a kind of simulation systems; (1) a stage 1 where a model library is derived for the SPICE, (2) a stage 2 where a typical SPICE model library and standard deviations for each of the SPICE model parameters are derived, (3) a stage 3 where a yield for a characteristic in question (an objective characteristic) is derived (for example, U.S. Pat. No. 6,978,229, and Sang-Hoon Lee et al., "An Efficient Statistical Analysis Methodology and Its Application to High-Density DRAMs," IEEE/ACM Proceedings of ICCAD'97, 1997, pp. 678-683.)

FIG. 11 shows a process flow in stage 1 in the conventional system for estimating yields. The purpose of stage 1 is to extract the SPICE model for devices used in an electronic circuit for the objective characteristics. In FIG. 11, after a TEG (Test Element Group; devices for characterization to find out problems due to design or manufacturing process) for creating the SPICE model library has been fabricated (Step S1101), electronic characteristics of the TEG are measured (step S1102.) The SPICE model library is created using the electric characteristics 1102 obtained. The SPICE model library is obtained by this step. In order to evaluate variations by devices, stage 1 is repeated, which brings multiple SPICE model libraries 1103.

FIG. 12 shows a process flow of stage 2. The purpose of this stage is to create a typical SPICE model library from the multiple SPICE model libraries 1103 obtained as described above and to extract standard deviations of each model parameter for the SPICE model library. For the typical SPICE model library, median value or average value and so on for the multiple SPICE model libraries depending on a purpose.

In FIG. 12, the typical SPICE model library is created from the multiple SPICE model libraries 1103 obtained as described above, and standard deviations for each of model parameters for the SPICE model library are extracted (step S1201.) With this step, the typical SPICE model library 1202, standard deviations 1203 for each of the SPICE model parameters, and a table for correlation coefficients 1204 indicating a correlation among the SPICE model parameters, are obtained.

FIG. 13 shows a process flow for stage 3. The purpose of this stage is to derive a yield of a characteristic (the objective characteristic) in question of yield. In FIG. 13, typical SPICE model library 1202, a standard deviation 1203 for each of the SPICE model parameters, the table for correlation coefficients 1204 between the SPICE model parameters, SPICE net list 1304 for the objective characteristic corresponding to the objective characteristic, plural standard normal random number sequences 1305 generating random numbers corresponding to the correlation coefficients between the SPICE model parameters are used to generate the SPICE model library having correlated model parameters with variations, and the SPICE net list for the objective characteristic for N times SPICE simulations collectively (step S1301). With this step, the SPICE model library having model parameters with variations and the SPICE net list 1301 for the objective characteristic are obtained for N times of simulations collectively.

Next, N times of simulations are performed using the SPICE model library having model parameters with variations and the SPICE net list 1301 for the objective characteristic for N times of simulations (step S1302.) With this step, the objective characteristic values with variations 1302 are obtained corresponding to N times of simulations. Then, for the objective characteristics values with variations, a frequency of satisfying a given specification (Pass) and a frequency of not satisfying the specification (Fail) are examined, and the yield Y (=Pass/N) is estimated. Thus, the yield is obtained.

A method to make stage 1 and 2 more efficient has been reported in Takeuchi, Hane "High efficiency Extraction Method of Statistical SPICE Parameter," The Japan Society of Applied Physics, Silicon Technology, No. 76, 2005, pp 41-45. A method to make stage 3 more efficient has been reported in Singhee et al., "Recursive Statistical Blockade: An Enhanced Technique for Rare Event Simulation with Application to SRAM Circuit Design," IEEE 21$^{st}$ International Conference on VLSI Design, 2008, pp. 131-136. In the method shown in Takeuchi, Hane, "High efficiency Extraction Method of Statistical SPICE Parameter," The Japan Society of Applied Physics, Silicon Technology, No. 76, 2005, pp 41-45 for stage 1 and 2, the library creation must be repeated as much as the measuring sample numbers, which causes a problem that the creation of the SPICE model library is time consuming.

In the method shown in Takeuchi, Hane "High efficiency Extraction Method of Statistical SPICE Parameter," The Japan Society of Applied Physics, Silicon Technology, No. 76, 2005, pp 41-45, the standard deviations are guessed by random guess or based on experiences. The problems of this method are that there is a possibility of taking a long time to find a correct standard of deviations and that even if found, it takes time to derive the standard deviations and the correlation coefficients. In the method disclosed in U.S. Pat. No. 6,978,229 or Sang-Hoon Lee et al., "An Efficient Statistical Analysis Methodology and Its Application to High-Density DRAMs," IEEE/ACM Proceedings of ICCAD'97, 1997, pp. 678-683, Monte Carlo repetition frequency over the inverse of a failure rate is required. This makes the SPICE repetition frequency enormous when the failure rate is small and causes a problem in that analysis does not complete within a practical time.

In the method of stage 3 disclosed in Singhee et al., "Recursive Statistical Blockade An Enhanced Technique for Rare Event Simulation with Application to SRAM Circuit Design," IEEE 21$^{st}$ International Conference on VLSI Design, 2008, pp. 131-136, speeding up may hardly be possible when the number of the variation model parameters increases. Also in stage 3 under the conventional method, the frequency for the Monte Carlo repetition and the number of the model parameters have to be lesser than required in order to complete the plural SPICE simulations within a practical time. This causes a problem in that accuracy of estimating the yield lowers.

On the other hand, Importance Sampling method is known as an accelerating method, as disclosed in R. Kanji, R. Joshi, S. Nassif, "Mixture Importance Sampling and its Application to the Analysis of SRAM Designs in the Presence of Rare Failure Events," Proceedings of Design Automation Conference 2006, pp. 69-72, July 2006. The importance sampling method takes samples with larger weight from a specific area expected to be important, instead of taking samples from all the sampling area in accordance with intrinsic natural probability distribution. For example, in estimating an occurrence probability of a very rare phenomenon, samples are taken following a probability distribution with much frequent occurrences and then a conversion to the actual occurrence probability is made when estimation is made.

A problem to be solved by the present invention is to create parameter information with high speed and with high accuracy for the use in the simulation of the electronic circuits. Another problem to be solved by the present invention is to estimate yields with high speed and high accuracy for objective characteristics taking into account variations in devices of the electronic circuits.

SUMMARY OF THE INVENTION

According to a first aspect of the present invention, a system for creating parameter information characterized by including the following means is provided:

means for creating random characteristic variation data, wherein variations for plural physical characteristics stored in a memory device are estimated, and the variations are decomposed into random variations corresponding to a random variation component of the physical characteristics and systematic variations corresponding to a systematic variation component, thus the random characteristic variation data representing the random variations are created;

means for creating sensitivity data, wherein the sensitivity data of typical simulation model parameters with respect to the physical characteristics are created using a typical simulation model library and simulation model equations;

means for creating variation data, wherein the variation data for simulation model parameters are created by dividing the random characteristics variation data by the sensitivity data; and means for creating parameter data, wherein standard deviations for each of the simulation model parameters and correlation coefficients between the simulation model parameters are estimated from the variation data for the simulation model parameters.

According to a second aspect of the present invention, a system for estimating yields characterized by including the following means is provided:

means for storing a typical simulation model library, standard deviations for plural simulation model parameters, correlation coefficient data for the simulation model parameters and a simulation net list for an objective characteristic;

means for creating simulation information, wherein the means for creating simulation information generates random numbers corresponding to the correlation coefficient data for the simulation model parameters, and creates a simulation model library having correlated model parameters with variations, and the simulation net list for the objective characteristic, by Monte Carlo method using the random numbers, the typical simulation model library, the standard deviations for the plural simulation model parameters and the simulation net list for a typical objective characteristic;

means for simulations, wherein the means for simulations obtains samples having the objective characteristic with variations, by making simulations using the simulation model library and the simulation net list for the objective characteristic created by the means for creating simulation information; and means for estimating yields, wherein the means for estimating yields estimates the yields by determining whether a predetermined specification is satisfied (=Pass) or not (=Fail) for samples having plural objective characteristics values with variations, wherein the samples being obtained by plural executions of the means for creating simulation information and the means for simulations, wherein further, the means for estimating yields includes a filter which learns a boundary for decisions of Pass or Fail, in addition to the decisions of Pass or Fail, and repeats the determination by making the simulations again for the samples on which the filter did not determine as Pass.

Here, for example, the filter may be divided to three regions; a gray region which is close to the boundary and thus making unable to determine Pass or Fail, a pass region where the samples can be decided as Pass, a fail region where the samples are decided as Fail. The means for estimating yields may be constituted so that it makes simulations and determination again only for the samples falling within the gray region and the fail region. The filter also may be realized by the SVM method, and may include an initial learning step and an iterative learning step, wherein in the former step the general position of the boundary is learned from an overall space of the simulation model parameter, while in the latter step the gray region is reduced by iteratively generating the samples near the boundary and learning. In creating the standard deviations for the simulation model parameters and the correlation coefficients between the simulation model parameters, the system for creating parameter information according to the claim 1 may also be included.

According to a third aspect of the present invention, a program for parameter information creation is provided, wherein the program for parameter information creation is characterized by making a computer function as means including;

means for creating random characteristic variation data, wherein variations for plural physical characteristics stored in a memory device are estimated, and the variations are decomposed into random variations corresponding to a random variation component of the physical characteristics and systematic variations corresponding to a systematic variation component, thus the random characteristic variation data representing the random variations are created;

means for creating sensitivity data, wherein the sensitivity data of typical simulation model parameters with respect to the physical characteristics are created using a typical simulation model library and simulation model equations;

means for creating variation data, wherein the variation data for simulation model parameters are created by dividing the random characteristics variation data by the sensitivity data; and means for creating parameter data, wherein standard deviations for each of the simulation model parameters and correlation coefficients between the simulation model parameters are estimated from the variation data for the simulation model parameters.

According to a forth aspect of the present invention, a program for yield estimation is provided, wherein the program for yield estimation is characterized by making a computer function as means including;

means for creating simulation information, wherein the means for creating simulation information generates random numbers corresponding to the correlation coefficient data for the simulation model parameters, and creates a simulation model library having correlated model parameters with variations, and the simulation net list for the objective characteristic, by Monte Carlo method using the random numbers, the typical simulation model library, the standard deviations for the plural simulation model parameters and the simulation net list for the typical objective characteristic;

means for simulations, wherein the means for simulations obtains samples having the objective characteristic with variations, by making simulations using the simulation model library and the simulation net list for the objective characteristic created by the means for creating simulation information; and means for estimating yields, wherein the means for estimating yields estimates the yields by determining whether a predetermined specification is satisfied (=Pass) or not (=Fail) for samples having plural objective characteristics values with variations, wherein the samples being obtained by plural executions of the means for creating simulation information and the means for simulations, wherein further,
the means for estimating yields includes a filter which learns a boundary for decisions of Pass or Fail, in addition to the decisions of Pass or Fail, and repeats the determination by making the simulations again for the samples on which the filter did not determine as Pass. According to a fifth aspect of the present invention, a recording medium which stores the program for parameter information creation or the program for yield estimation is stored.

ADVANTAGEOUS EFFECTS OF THE INVENTION

The system for creating parameter information by the present invention enables a creation of parameter information used in the simulations of the electronic circuits with high speed and high accuracy. The system for estimating yields of present invention enables estimations of yields for an objective characteristic with high speed and high accuracy, taking into account variations of devices in the electronic circuits. Executions of the programs of the present invention by a computer enable the constitution of a system for creating parameter information and the system for estimating the yields.

BRIEF DESCRIPTION OF THE DRAWINGS

FIG. 7 shows a flow chart for a process in a preferred embodiment of the invention.

DESCRIPTION OF THE EMBODIMENTS

Hereafter, the system for creating parameter information, the system for estimating yields, the method of creating parameter information, the method of estimating yields, the program for parameter information creation, the program for yield estimation, and the recording medium which is computer readable and storing the program for parameter information creation and one for yield estimation according to the present invention will be explained along with the drawings. In each of the drawings, a same part has a same notation.

Figure 1:
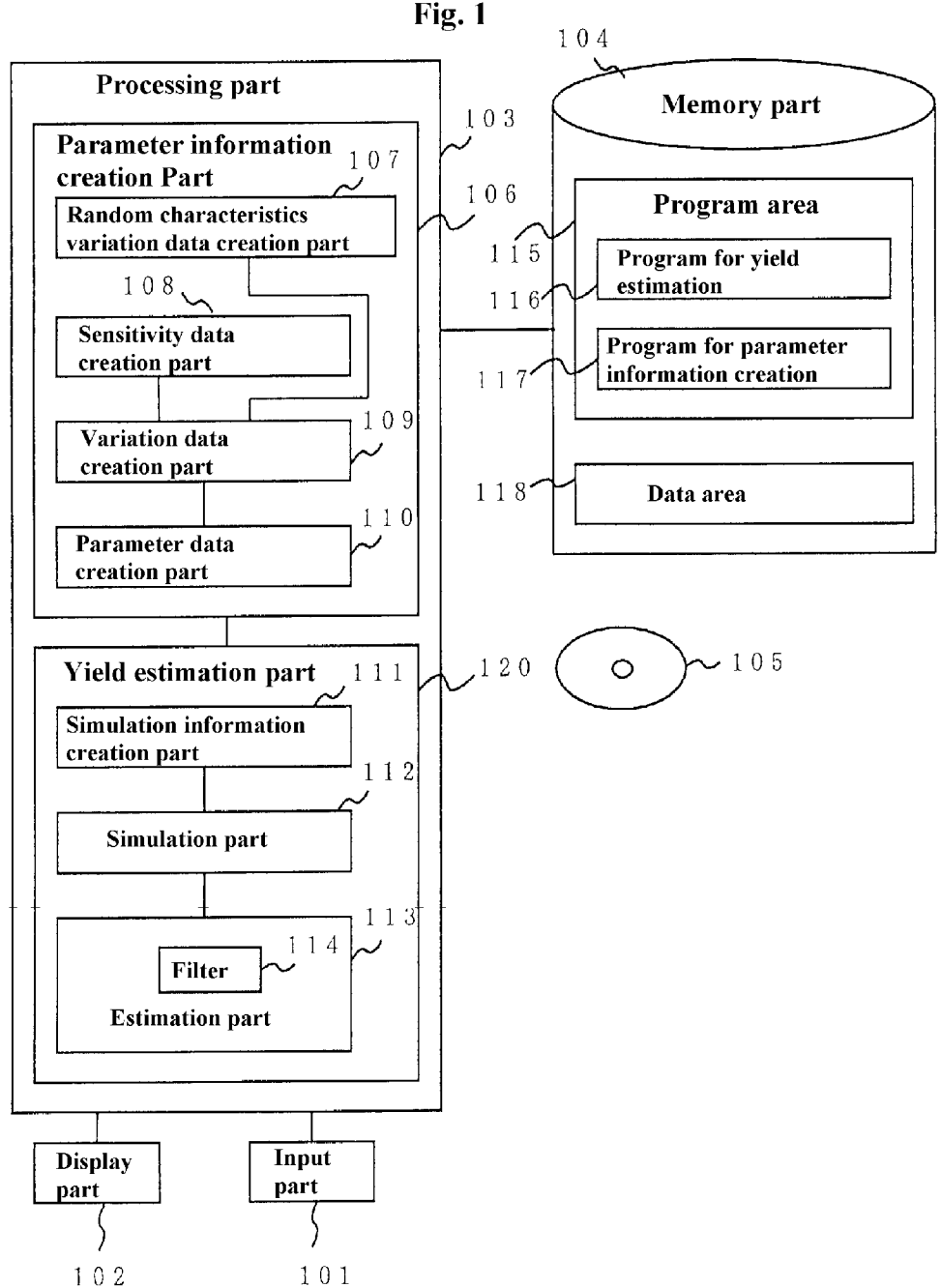
FIG. 1 shows a block diagram of the system for estimating yields, including the system for creating parameter information in a preferred embodiment of the present invention.

FIG. 1 is a system block diagram of a preferred embodiment of the present invention, showing the system which is constituted by the system for creating parameter information and the system for estimating yields. In the embodiment, the system for estimating yields includes the system for creating parameter information. The system for creating parameter information and the system for estimating yields can be configured by a computer.

In FIG. 1, the system for estimating yields includes an input part 101 having a keyboard and a mouse, a display part 102 having a liquid crystal display (LCD) and so on, a processing part 103 having a central processing unit (CPU) and performing a process of creating parameter information and that of estimating yields, and a memory part 104 storing programs executed in the processing part and various data. The memory part is an example of the means for storing. The recording medium 105 which is readable by the computer, such as CD-ROM (Compact Disc-Read Only Memory), stores programs (for example, the program for parameter information creation and the one for yield estimation) executed in the processing part 103. Those programs stored in the recording medium 105 are stored in the program area 115 of the memory part 104 in an actual operation.

The memory part 104 includes a program area 115 which memorizes programs, and a data area 118 which memorizes various data such as those required for processing of parameters or processing results of the yields. The program area 115 memorizes the programs stored in the recording medium 105, in an executable form, as the program for parameter information creation 116 and the program for yield estimation 117. The processing part 103 executes the program for parameter information creation and the program for yield estimation, stored in the memory part 104. Those function as the parameter information creation part 106, and the yield estimation part 120, respectively.

The parameter information creation part 106 which is an example of the system for creating parameter information, including;

a random characteristics variation data creation part 107 which is an example of the means for creating random characteristics variation data, a sensitivity data creation part 108 which is an example of the means for creating the sensitivity data, a variation data creation part 109 which is an example of the means for creating variation data, a parameter data creation part 110 which is an example of the means for creating parameter data.

The random characteristics variation data creation part 107 can estimate the variations for plural characteristics stored in the memory part 104, then decomposes the variations into the random variation component wherein the characteristic varies randomly, and into the systematic variation component wherein the variation varies systematically (i.e., a variation that is not random and has a correlation), and further creates the random characteristic variation data corresponding to the random variation component.

The sensitivity data creation part 108 can create sensitivity data corresponding to the sensitivities of the typical simulation model parameters with respect to the physical characteristics, using the typical simulation model parameters and simulation model equations stored in the memory part 104. The variation data creation part 109 can estimate the variation data of the simulation model parameters by dividing the random characteristics variation data by the sensitivity data. The parameter data creation part 110 can create the standard deviations for each of the simulation model parameters and the correlation coefficients between the simulation model parameters, from the variation data of the simulation model parameters.

On the other hand, the yield estimation part 120 includes a simulation information creation part 111 which is an example of the means for creating simulation information, a simulation execution part 112 which is an example of the means for simulation, and an estimation part 113 which is an example of the means for estimation. The estimation part includes the filter 114 which is an example of the filter. The simulation information creation part 111 can generate the random numbers corresponding to the correlation coefficients between the simulation model parameters, and can create the simulation model library with variations and correlated model parameters, and the simulation net list for the objective characteristic, by Monte Carlo method using the random numbers, the typical simulation model library, the standard deviations for the plural simulation model parameters and the simulation net list for the typical objective characteristic.

The simulation part 112 can obtain samples having the objective characteristic with variations, by making the simulations using the simulation model library and the simulation net list for the objective characteristics created by the simulation information creation part 111. The estimation part 113 can estimate yields by determining whether predetermined specifications are satisfied or not (Pass or Fail) by plural samples with the objective characteristics with variations, which are obtained by plural executions of the simulation information creation part 111 and the simulation part 112. Further the estimation part 113 includes a filter which learns boundaries for determining Pass or Fail, in addition to judging Pass or Fail, and can repeat the decisions of Pass or Fail by making the simulations again for the samples which the filter did not determine as Pass, among the plural samples with the objective characteristic with variations.

The preferred embodiments of the present invention adopt the SPICE for the simulations. The system for estimating yields under the present invention is constituted so that the processes are divided into following three stages;
(1) stage 1 deriving the typical SPICE model library,
(2) stage 2 deriving the standard deviations for each of the SPICE model parameters and the correlation coefficients between those SPICE model parameters, and
(3) stage 3 estimating the yields for the required characteristics (the objective characteristics).

The flow chart used in below explanations shows the functions of parts from 106 to 114 and 120 in the processing part 103.

Figure 2:
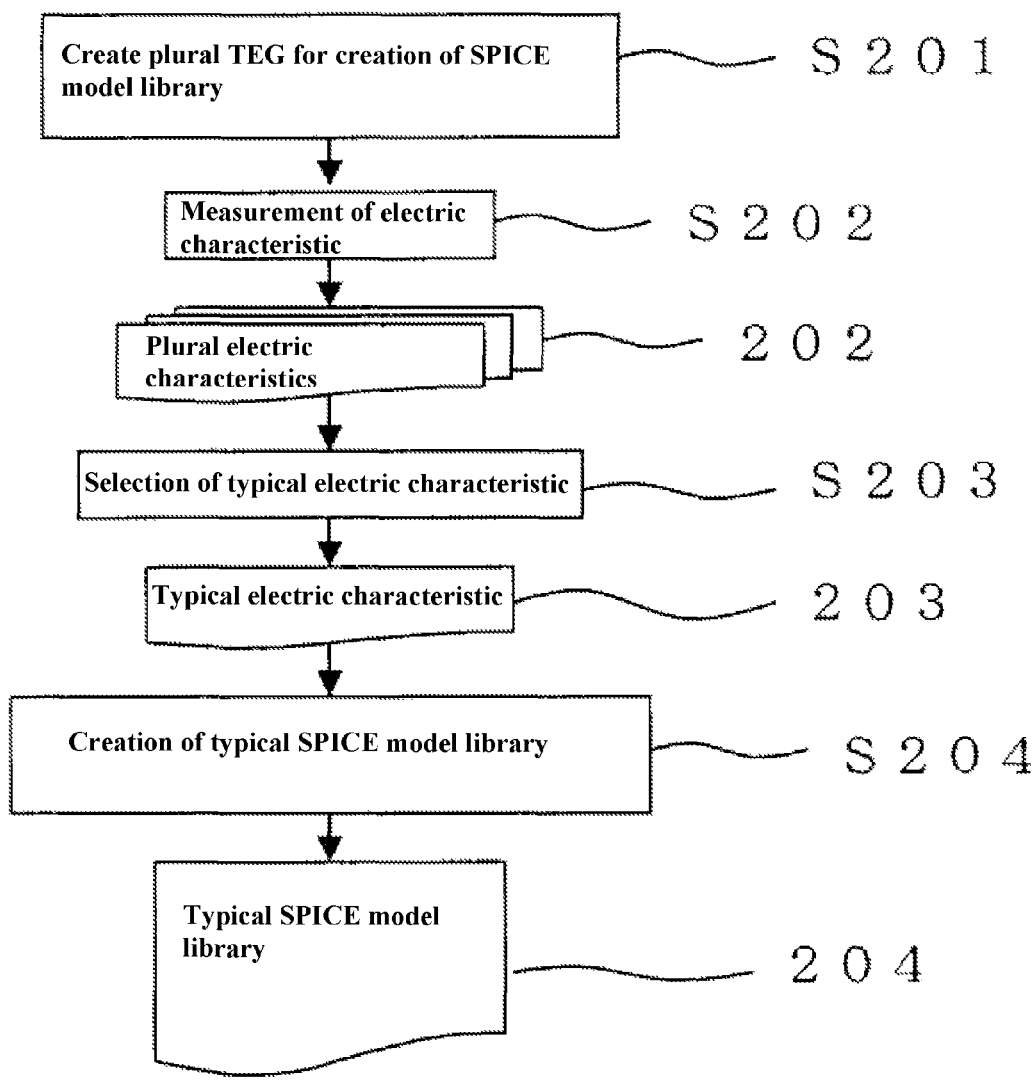
FIG. 2 shows a flow chart for a process in a preferred embodiment of the invention.

FIG. 2 is a flow chart showing the process in stage 1. The purpose of stage 1 is to extract the SPICE model parameters for the typical device(s) used in the circuit for the objective characteristics. In FIG. 2, after a TEG (Test Element Group; test devices to find out problems due to design or manufacturing process) for creating the SPICE model library has been fabricated (Step S201), electric characteristics of the TEG are measured (step S202.) Plural electric characteristics 202 are obtained by these steps, and stored in the data area 118 in the memory part 104.

Next, the SPICE model library is created using the plural electric characteristics stored in the data area 118. In this situation, at first, a typical electric characteristic 203 is selected from the plural electric characteristics 202 (step S203.) As for the typical electric characteristic, a median value or average value and so on may be chosen depending on the purpose. The obtained typical electric characteristic is stored in the data area 118. Then, the typical SPICE model library is created using the plural electric characteristics stored in the data area 118. With this step, the typical SPICE model library 204 which is a SPICE model library that has used the typical electric characteristics is obtained (step S204). The obtained typical SPICE model library 204 is stored in the data area 118.

Figure 11:
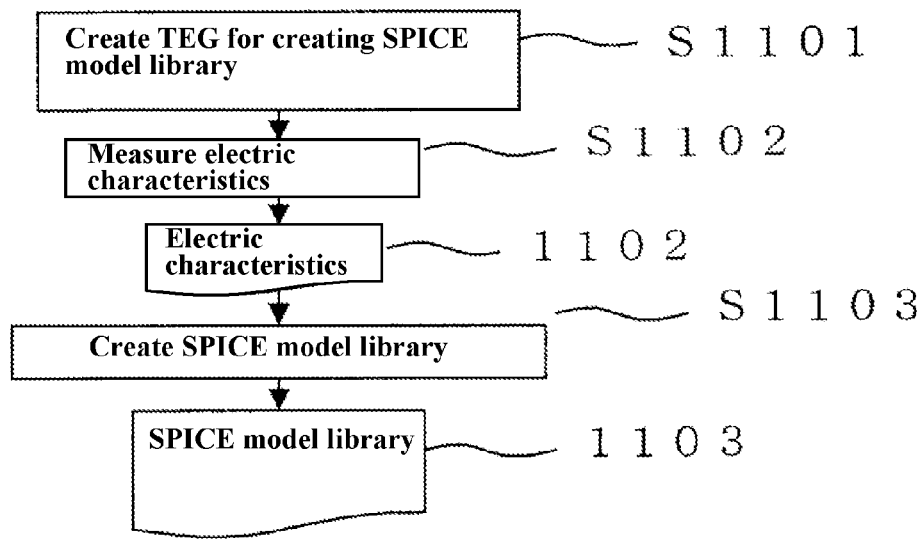
FIG. 11 shows a flow chart for a process in an example of the invention.
Figure 12:
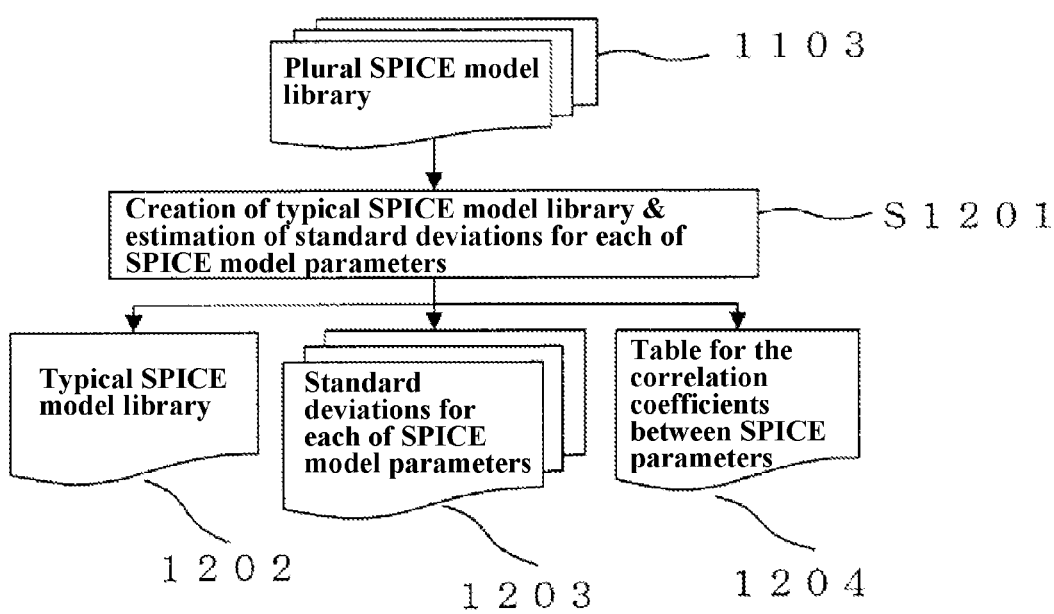
FIG. 12 shows a flow chart for a process in an example of the invention.

Conventionally, as explained in the FIG. 11 and FIG. 12, plural electric characteristics were calculated at first, and the SPICE model libraries were created for each of the electric characteristics, then the typical SPICE model library was created. On the other hand, in the preferred embodiment of the present invention, after the calculation of the plural electric characteristics, the typical electric characteristics are calculated readily. Then, the typical SPICE model library is created. Thus, the process to create the typical SPICE model library is simpler in the present invention than that of conventional one, which enables more speedy process compared with the conventional ones.

Figure 3:
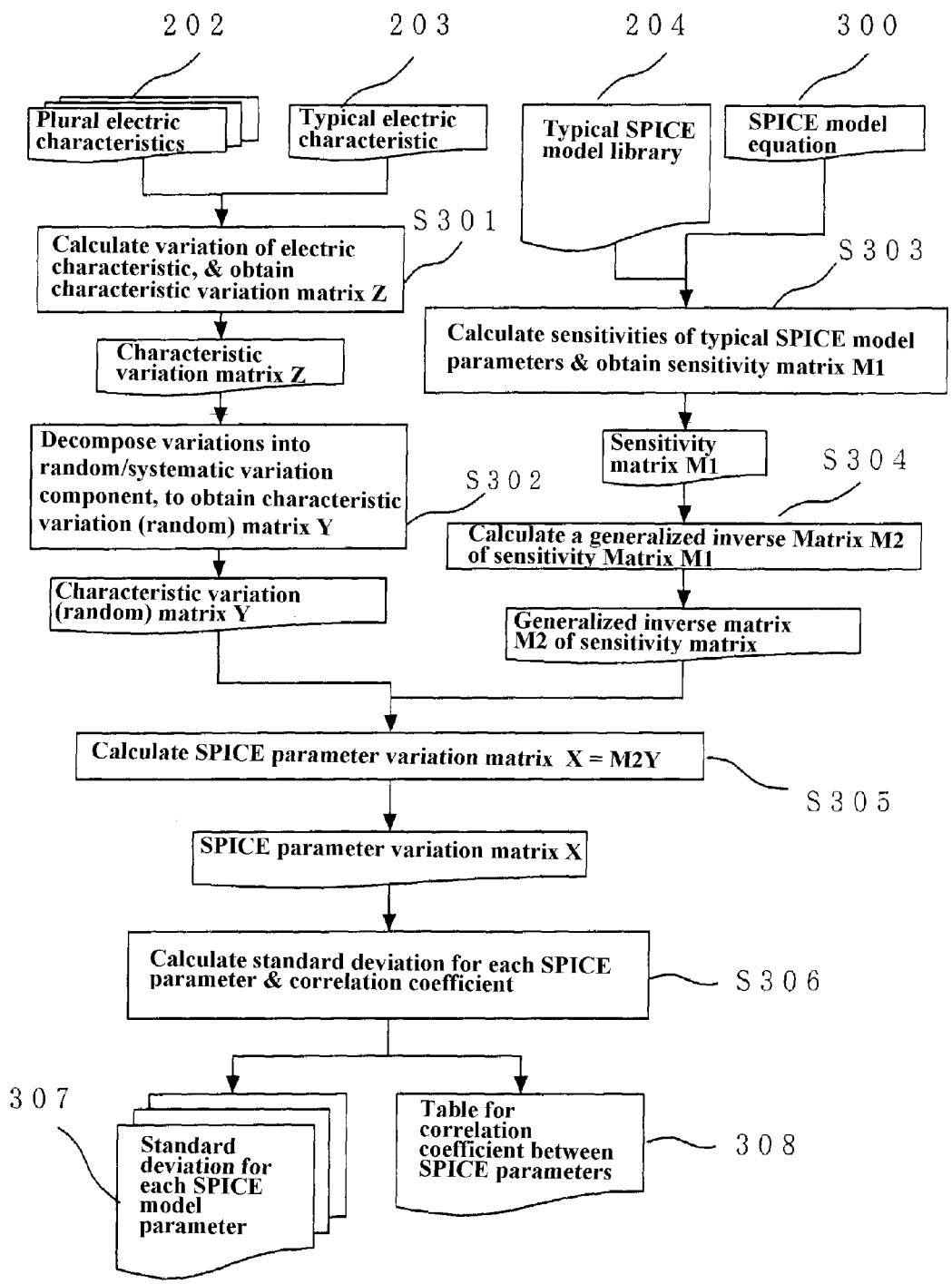
FIG. 3 shows a flow chart for a process in a preferred embodiment of the invention.

FIG. 3 is the flow chart for stage 2. The plural SPICE model libraries are derived using the plural electric characteristics obtained in stage 1. The purpose of this stage is to derive the standard deviations for each of the SPICE model parameters from the plural SPICE model library. Also a table of the correlation coefficients between the SPICE model parameters is obtained, simultaneously.

In FIG. 3, variations for electric characteristics are calculated using the plural electric characteristics 202 and the typical electric characteristics 203, obtaining the characteristics variation matrix Z (step S301.) With this step, the overall characteristics variation matrix Z (H rows and K columns) is derived as shown in below Eq. (1).

Hereafter, the notation H, K and n indicates the number of the measuring bias conditions, the number of the devices under measurement, and the number of SPICE model parameters assumed to have variations, respectively. The notations h, i and k denotes the bias number, parameter number and device number, respectively. The notation Δ in the matrices Z, X and Y represents the deviation from the typical value.

$$Z = \begin{bmatrix} \Delta z_{1,1} & \cdots & \Delta z_{k,1} & \cdots & \Delta z_{K,1} \\ \cdots & \cdots & \cdots & \cdots & \cdots \\ \Delta z_{1,h} & \cdots & \Delta z_{k,h} & \cdots & \Delta z_{K,h} \\ \cdots & \cdots & \cdots & \cdots & \cdots \\ \Delta z_{1,H} & \cdots & \Delta z_{k,H} & \cdots & \Delta z_{K,H} \end{bmatrix} \quad (1)$$

$\Delta z_{k,h}$ = Characteristic deviation for device number $k$, bias number $h$ $(1 \leq k \leq K, 1 \leq h \leq H)$ Here, in case of SRAM (static random access memory), for example, $\Delta z = \Delta I_d$ (drain current.)

Next, the variations are decomposed into a random variation component and a systematic variation component, obtaining the matrix for the random variation component (step S302.) The random variation denotes the variation that is due to the randomly varied cause such as variation of impurities, and that is uncontrollable. The systematic variation denotes the variation that is due to the cause with normalized variation, and one that is determined by configurations of devices on LSI chip, such as distances between devices, structures of devices, density of gates, density of wires, and that which is controllable.

The simulation checks the characteristics when the model parameters are varied randomly using the random variations. Various methods are known for separating the random variation and the systematic variation. For example, using the polynomial expression approximation, the random and systematic variation components are distinguished and the random components are extracted. With this step, the random characteristics variation matrix Y(H rows and K columns) is derived as expressed by Eq. (2).

$$Y = \begin{bmatrix} \Delta y_{1,1} & \cdots & \Delta y_{k,1} & \cdots & \Delta y_{K,1} \\ \cdots & \cdots & \cdots & \cdots & \cdots \\ \Delta y_{1,h} & \cdots & \Delta y_{k,h} & \cdots & \Delta y_{K,h} \\ \cdots & \cdots & \cdots & \cdots & \cdots \\ \Delta y_{1,H} & \cdots & \Delta y_{k,H} & \cdots & \Delta y_{K,H} \end{bmatrix} \quad (2)$$

$\Delta y_{k,h}$ = Characteristic deviation for device number $k$, at bias number $h$ (random component)

$(1 \leq k \leq K, 1 \leq h \leq H)$

Here, in case of SRAM, for example, $\Delta y = \Delta I_d$ (random component.)

On the other hand, the sensitivity matrix M1 is obtained using the typical SPICE model library 204 and the SPICE model equations 300 stored in the data area 118 (step S303.) As for the SPICE model equations, a model equation for the current-voltage characteristics for a transistor may be an example. However, since many model equations have been published, one can chose a suitable SPICE model equation from those, depending on one's purpose.

The sensitivity means a sensitivity of a model parameter ($V_{th0}$, L, $T_{oxe}$ etc) with respect to each of the electric characteristics (drain current $I_d$ or threshold voltage $V_{th}$.) The sensitivity is derived by calculation, where the required data are obtained as the sensitivity by measuring a change in the model parameter when the gate voltage $V_g$ or the drain voltage $V_d$ was varied. Alternatively, the substrate voltage $V_b$ or the source voltage $V_s$ may possibly be varied in the measurement. The sensitivity itself is constant, where the variation of the model parameter causes the variation of the current. The sensitivity can be determined when the typical SPICE model parameters are known.

An example for the sensitivity calculation process is shown below. Where there is a drain current characteristics model expressed as;

$$I_d = I_d(V_d, V_g, V_s, V_b, p_1, \ldots, p_m), 1 \leq i \leq m,$$

wherein $V_d$: drain voltage, $V_g$: gate voltage, $V_s$: source voltage, $V_b$: substrate voltage, $p_1, \ldots, p_i, \ldots, p_m$: the SPICE model parameters, m: the number of the SPICE model parameters, $C_{pi}$, the sensitivity of $p_i$ with respect to $I_d$, is defined as below;

$$C_{pi} = \partial I_d / \partial p_i = \partial I_d(V_d, V_g, V_s, V_b, p_1, \ldots, p_m) / \partial p_i.$$

Therefore, the sensitivity $C_{pi}$ when the model parameter $p_i$ is at a typical value $p_{ityp}$ can be calculates as below;

$$C_{pi} = (\partial I_d / \partial p_i) p_i = p_{ityp}$$
$$= \partial I_d(V_d, V_g, V_s, V_b, p_1, \ldots, p_i = p_{ityp} + \Delta_{pi}, \ldots, p_m) / \partial p_i$$
$$\approx (I_d(V_d, V_g, V_s, V_b, p_1, \ldots, p_i = p_{ityp} + \Delta_{pi}, \ldots, p_m) -$$
$$I_d(V_d, V_g, V_s, V_b, p_1, \ldots, p_i = p_{ityp} \cdot \Delta_{pi}, \ldots, p_m))/2\Delta_{pi}.$$

Here the above approximation is derived by the method of finite difference.

The sensitivity matrix M1 (H rows and n columns) obtained is expressed by following Eq. (3);

$$M1 = \begin{bmatrix} c_{1,1} & \cdots & c_{i,1} & \cdots & c_{n,1} \\ \cdots & \cdots & \cdots & \cdots & \cdots \\ c_{1,h} & \cdots & c_{i,h} & \cdots & c_{n,h} \\ \cdots & \cdots & \cdots & \cdots & \cdots \\ c_{1,H} & \cdots & c_{i,H} & \cdots & c_{n,H} \end{bmatrix} \quad (3)$$

$c_{i,h}$ = Sensitivity for parameters number $i$, bias number $h$ $(1 \leq i \leq n, 1 \leq h \leq H)$ Here, in case of SRAM, for example, $c = (\partial I_d / \partial V_{th0})$.

Next, a generalized inverse matrix M2 (n rows and H columns) for the sensitivity matrix M1 (step S304), which is expressed by below Eq. (4);

$$M2 = \begin{bmatrix} d_{1,1} & \cdots & d_{h,1} & \cdots & d_{H,1} \\ \cdots & \cdots & \cdots & \cdots & \cdots \\ d_{1,i} & \cdots & d_{h,i} & \cdots & d_{H,i} \\ \cdots & \cdots & \cdots & \cdots & \cdots \\ d_{1,n} & \cdots & d_{h,n} & \cdots & d_{H,n} \end{bmatrix} \quad (4)$$

$d_{h,i}$ = Matrix element for bias number $h$, parameter number $i$ $(1 \leq h \leq H, 1 \leq i \leq n)$ Here, in case of SRAM, for example, d is a matrix element for the matrix M2.

Next, the SPICE model parameter variation matrix X (=M2·Y) is calculated (step S305.) A characteristic variation due to a variation of a model parameter is obtained by multiplying the variation of the model parameter and sensitivity as a coefficient. By repeating this procedure for all the model parameters to be considered, the characteristic variations corresponding to each of the variations of the model parameters are obtained. The sum of the characteristic variations corresponding to each of the variations of the model parameters gives the characteristic variation due to the variations of all the model parameters considered. The SPICE model parameter variation matrix X satisfies the relation Y=M1·X. Thus, the SPICE model parameter variation matrix X (n rows and K columns) is obtained as described below;

$$X = \begin{bmatrix} \Delta p_{1,1} & \cdots & \Delta p_{p_k,1} & \cdots & \Delta p_{K,1} \\ \cdots & \cdots & \cdots & \cdots & \cdots \\ \Delta p_{1,i} & \cdots & \Delta p_{k,i} & \cdots & \Delta p_{K,i} \\ \cdots & \cdots & \cdots & \cdots & \cdots \\ \Delta p_{1,n} & \cdots & \Delta p_{k,n} & \cdots & \Delta p_{K,n} \end{bmatrix} \quad (5)$$

$\Delta p_{k,i}$ = Deviation of parameter for device number $k$, parameter number $i$ $(1 \leq k \leq K, 1 \leq i \leq n)$ Here, in case of SRAM, for example, $\Delta p = \Delta V_{th0}$.

Each row of the variation matrix X, represents the variations (deviations from a typical value) of one of the model parameters for all the devices (for example, the first to the Kth transistor.) Each column of the variation matrix X, represents the deviations for one of the devices and for all of the model parameters (the first to the nth parameter). Next, the standard deviations for each of the model parameters and the correlation coefficients between the model parameters are calculated from the SPICE model parameter variation matrix X (step S306.)

With this step, the standard deviations for each of the SPICE model parameters 307 and the table for the correlation coefficients between the SPICE model parameters 308 are derived. The standard deviations for each of the SPICE model parameters are obtained from each row. The table for correlation coefficients indicates the correlation between the rows of the variation matrix X. An example of the table for correlation coefficients 308 for the NMOS case is given as below;

TABLE 1

|  | XL | VTH0 | TOXE |
|---|---|---|---|
| XL | 1.00 | 0.01 | −0.99 |
| VTH0 | 0.01 | 1.00 | 0.47 |
| TOXE | −0.99 | 0.47 | 1.00 |

The standard deviations 307 for each of the SPICE model parameters and the table 308 for the correlation coefficients between the SPICE model parameters are stored at the data area 118 of the memory part 104. Those are performances of the system for creating parameter information system. The standard deviations 307 for each of the SPICE model parameters and the table for the correlation coefficients 308 between the SPICE model parameters thus obtained are used to estimate the yields. By all means, those may be used for other purposes.

Figure 4:
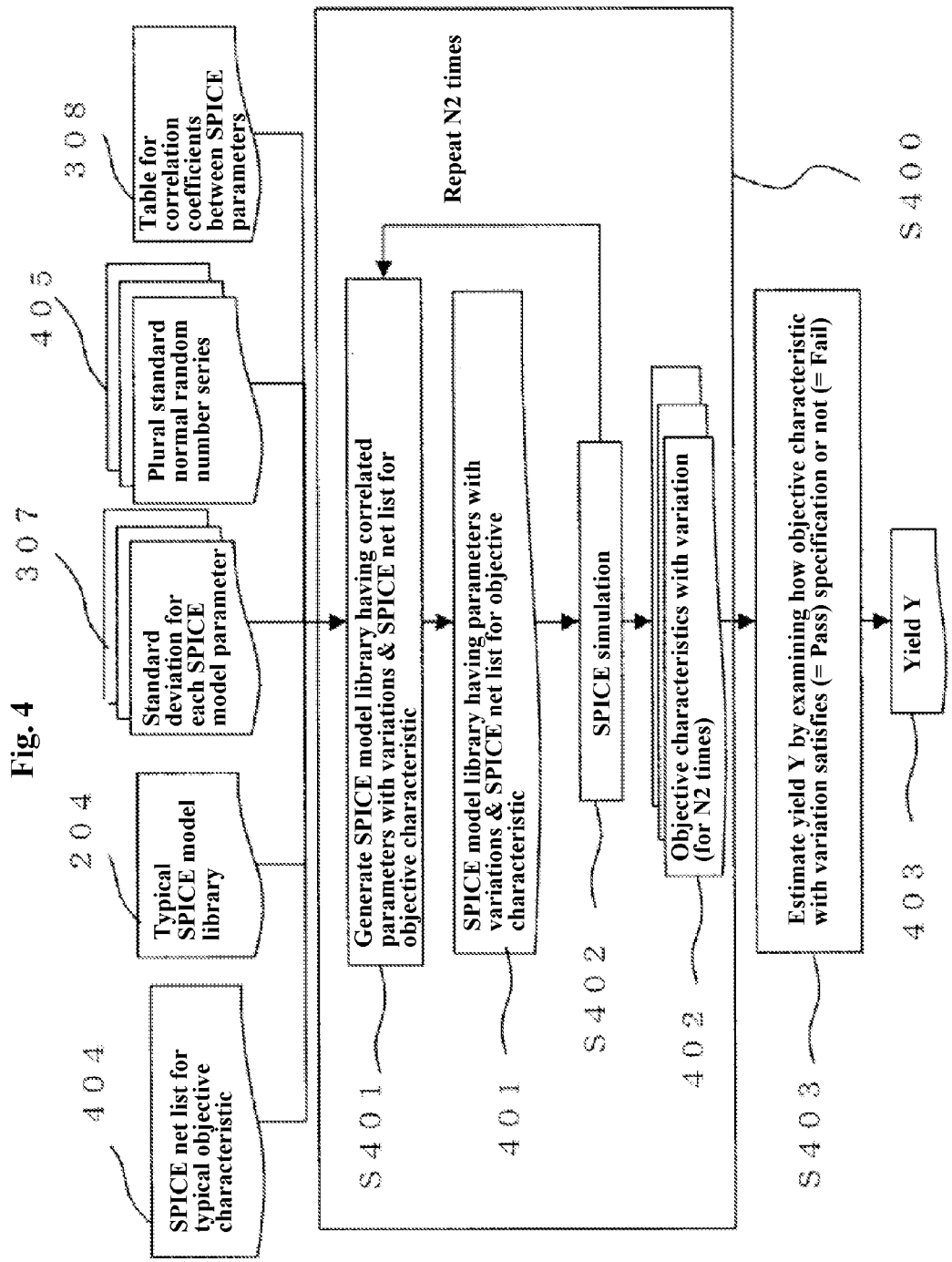
FIG. 4 shows a flow chart for a process in a preferred embodiment of the invention.

FIG. 4 is a flow chart showing a process in stage 3. The purpose of this stage is to estimate yields for the objective characteristics. In FIG. 4, the overview and explanation for the estimation process for the objective characteristics with variations 5400 (includes SPICE net list creation process S401 and SPICE simulation process S402) are shown in FIG. 5 and FIGS. 6A and 6B, while a detail of the estimation process for the objective characteristics with variations 5400 is shown in FIG. 7.

Figure 5:
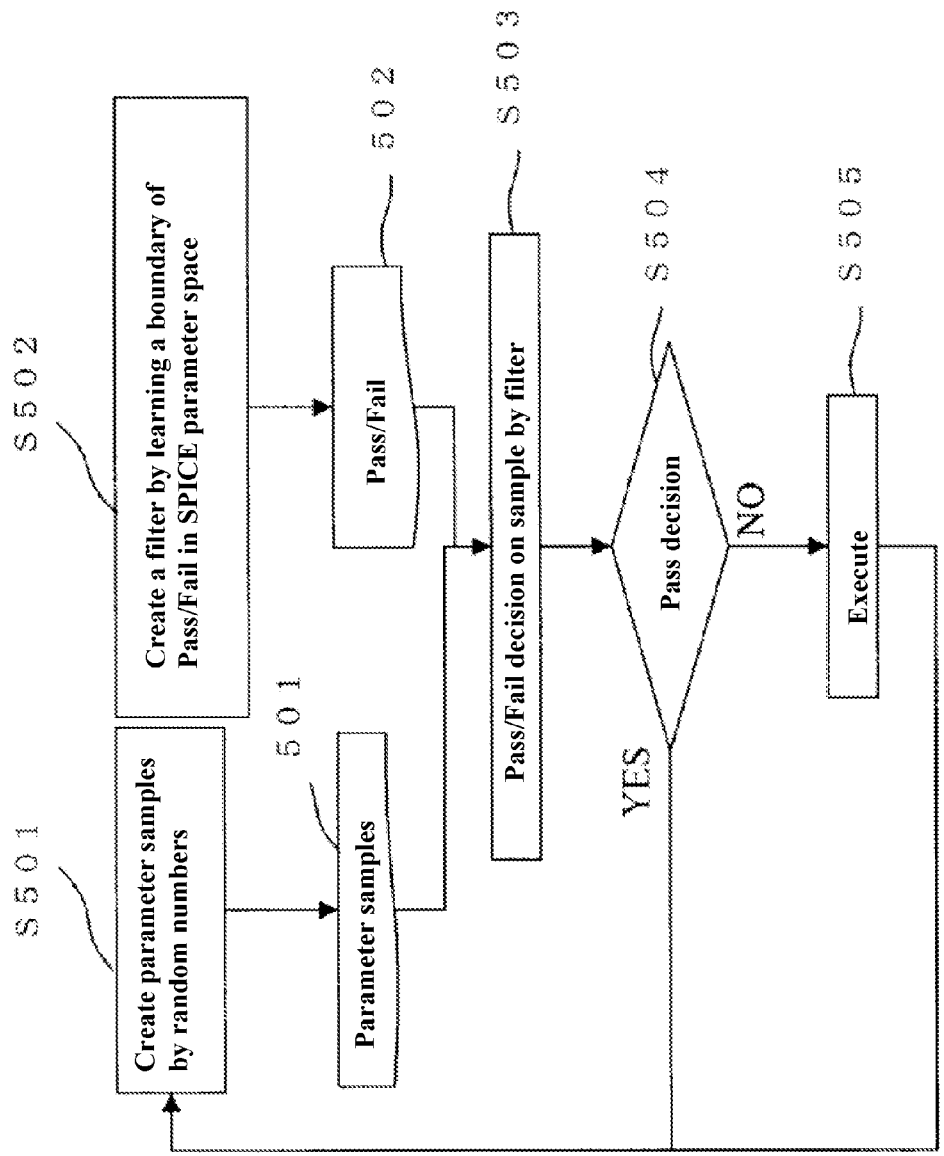
FIG. 5 shows a flow chart for a process in a preferred embodiment of the invention.
Figure 6A:
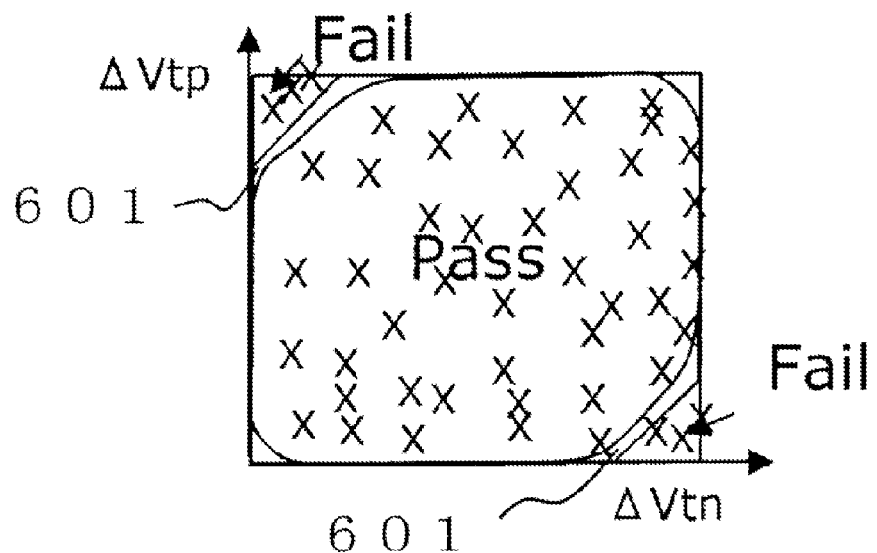
FIGS. 6A and 6B show a process in a preferred embodiment of the invention.
Figure 6B:
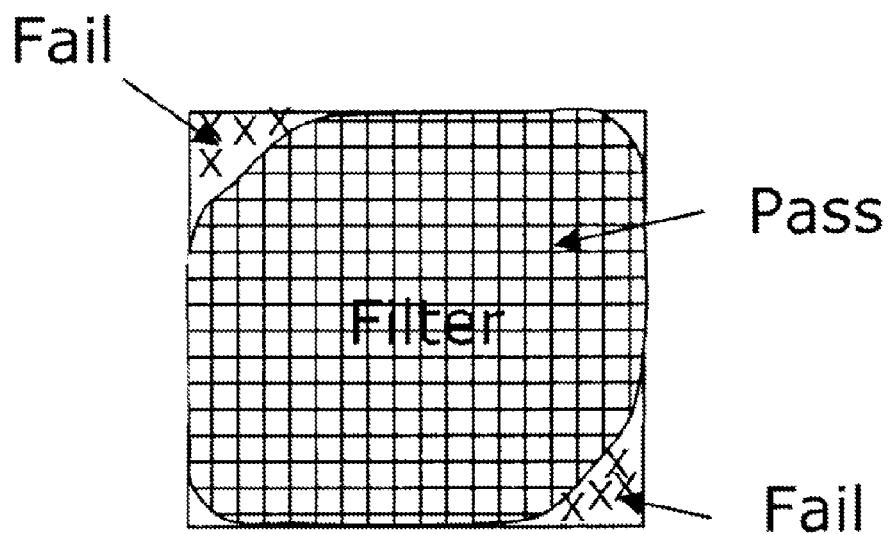

FIG. 5 to FIG. 7 shows mainly the estimation process for the objective characteristics with variations, and methods to realize a high accuracy in identifying the boundaries of the filter that determines Pass/Fail as described later, and a high speed process of the Monte Carlo method used in the Pass/Fail decisions. On the other hand, the SPICE simulation S402 for N2 times in FIG. 4 may be constituted by distributed processing, by executing SPICE in parallel with plural computers.

In FIG. 4, the process in stage 3 is overviewed as below. Typical SPICE model library 204, the standard deviation 307 for each SPICE model parameter, the table for correlation coefficients 308 between SPICE model parameters, the typical SPICE net list 404 for the objective characteristics and plural standard normal random number series 405 are used for following processing. The typical SPICE model library 204, the standard deviation 307 for each of the SPICE model parameters, the table for correlation coefficients 308 between SPICE model parameters are derived by the stage 1 and 2, and stored in the data area 118.

The SPICE net list 404 for the typical objective characteristics is a typical net list which has been predetermined corresponding to the purpose, and includes model parameters as variables. The model parameters are given random fluctuation by Monte Carlo method for the SPICE simulation. The SPICE net list 404 for the typical objective characteristics is data stored in the data area 118 beforehand, while the plural standard normal random number series 405 may either be stored in the data area beforehand or be generated when required.

Using the table for correlation coefficients 308 between SPICE model parameters, the standard normal random number series are generated as the random numbers used in the Monte Carlo method, by varying the standard normal random number series depending on the correlation coefficients.

At first, the SPICE model library having model parameters with correlations and variations and the SPICE net list for the objective characteristics are generated using the typical SPICE model library 204, the standard deviations 307 for each of the SPICE model parameters, the table for correlation coefficients 308 between SPICE model parameters, the SPICE net list 404 for the typical objective characteristics and plural standard normal random number series 405 (step S401.)

In this step, the SPICE model library having model parameters with correlation and variations, and the SPICE net list for the objective characteristics are created by generating the random numbers using the table for correlation coefficients 308 between SPICE model parameters, and using the Monte Carlo method (step S401.) The SPICE model library having model parameters with correlation and variations, and the SPICE net list for the objective characteristics 401 are stored in the data area 118.

The SPICE simulations are executed by using the SPICE model library having model parameters with correlation and variations, and SPICE net list for the objective characteristics 401 (step S402.) The process 5401 and 5402 are repeated N2 times. Here N2 is a number much smaller than the number N explained in FIG. 13 (N2<<N.) As described earlier, in the conventional method, the SPICE model library and SPICE net list for the objective characteristics are generated as a set for N time repetitions. On the other hand, in the present embodiment, the SPICE net list for the objective characteristics is generated in each time of simulation. It is repeated N2 times, which is fewer times than conventional one.

Thus, plural samples having the objective characteristics with variations (for N2 times in the example of FIG. 4), those samples are stored in the data area 118. Next, the yield (=(total appearance number of Pass)/N2) is estimated by examining how the objective characteristic values 402 for each sample satisfies (Pass) the specified characteristic value or not (Fail.) The obtained yield data Y is stored in the data area 118, and displayed in the display part 102.

Overview of the process 5400 for estimation of the objective characteristics with variations will be explained here with FIG. 5. At first, model parameter samples 501 are created with random numbers (step S501.) The boundary of Pass or Fail in the SPICE model parameters is learned, and a filter to distinguish Pass or Fail (Pass/Fail Filter) 502 is created (114 in FIG. 1.) In the present embodiment, SVM (Support Vector Machine) method has been adopted.

FIGS. 6A and 6B show the filter 502 conceptually, where as shown in FIG. 6A, parameter sample 501 may include Pass which represents the case where the predetermined condition is satisfied, and Fail which represents the case where the predetermined condition is not satisfied. The boundary of the filter will be determined progressively by learning function, and divide into Pass area that passes Pass and Fail area that passes Fail. Next, Pass/Fail determinations of samples 501 by the filter 502 are executed using the model parameter samples 501 and Filter 502 (step S503.)

When the determination result is not Pass (step S504), the SPICE simulation is executed again to reconfirm that it actually is not Pass (step S505.) That is, as shown in FIG. 6B, only the determination as Pass is made without any other processing for the model parameter sample 501 which passed the Pass area of the filter, while the SPICE simulation is executed again only for the model parameters which passed the area other than Pass (Fail area and the boundary area where the determination is gray) in order to confirm whether it is not Pass actually. Thus, the SPICE simulations are made only for the samples that possibly may not Pass, which enables fast processing of the determination. Further, the determination with high accuracy and good quality is realized, since the boundary of the filter to judge Pass or Fail is determined by the learning function. After above process, the determinations will be made for the next model parameter sample, returning to step S501.

On the other hand, when the determination is Pass in the process step S504, it is decided as Pass adopting the result, and return to the process step S501. As described above, Pass or Fail determination is made for each model parameter sample, the determination results are stored in the data area 118, which will be used in the yield estimation process (step S403) shown in FIG. 4.

Next, detail of the estimation process of the objective characteristics with variations S400 will be explained below, referring FIG. 7. In FIG. 7, the estimation process of the objective characteristics with variations includes three steps; an initial learning step S710, a repeated learning step S720, and a real step S730.

The learning step includes the initial learning step S710 where abstract position of the boundary is learnt from the whole model parameter space at first, and the repeated learning step S720 where the gray region is reduced by generating the samples near the boundary and by learning. In the initial learning step S710, at first learning samples are generated by random numbers (step S701) and the SPICE model parameters with variations are created (step S702). Then, SPICE is executed (step S703.)

Next, the SPICE execution results are classified (here, Pass as class 1, Fail as class 2) (step S704.) This process is repeated for predetermined times (step S705.) After that, support vectors under SVM method are generated from the learning samples, and the boundary of the classes is determined (support vector learning) (step S706.) With this process, basic initial filter is created which can distinguish the learning sample as Pass or Fail.

Next, the process moves on to the repeated learning step S720. Here, at first learning samples are generated by random numbers (step S721), and then the classification by the SVM method is executed using whichever the newer filter created either in the initial learning step S710 or in this repeated learning step S720 (step S722.) The classes in the classification are named as; (1) Class 1_Non Gray for the class regarded Pass, (2) Class 1_Gray for the class as candidate for Pass, (3) Class 2_Gray for the class as candidate for Fail, and (4) Class 2_Non Gray for the class regarded as Fail.

Next, after filtering of the Class 1_Non Gray samples (step S723), and having accumulated the Gray samples up to a certain predetermined amount (step S724), a new boundary of the classes is determined (that is learnt iteratively) from the existing support vectors and the accumulated Gray samples (Class 1_Gray and Class 2_Gray samples), and return to the process step S722 (step S725.) In the process step S722, the new boundary filter will be used.

On the other hand, after the filtering of the Class 1_Non Gray samples in the process step S723, the SPICE simulations will be made for other samples (that is, Gray samples (Class 1_Gray and Class 2_Gray samples) and Class 2_Non Gray) to accurately determine the Pass or Fail of each of those samples (step S726.) The iterative learning is completed by repeating the process step S721 and S726 for a predetermined times.

Then, the process moves on to the real step (step S730), where Pass or Fail determinations are made using the real samples. Here, the real samples are generated by the random numbers (step S731) for the processing by Monte Carlo method, and then classification will be made by SVM method (step S732) using the newest filter among those created in the iterative learning step S720. The classification here is made similarly to that done in the step S722.

Next, after the filtering of the Class 1_Non Gray samples (step S733), the SPICE simulations will be made for other samples (that is, Gray samples (Class 1_Gray and Class 2_Gray samples) and Class 2_Non Gray) to accurately determine the Pass or Fail of each of those samples (step S734.) The process steps S731 to S734 will be repeated for a predetermined times (step S735.) After completing the determination for the predetermined number of samples, the yield is estimated based on the determination results (step S403) and the yield 403 will be obtained.

Figure 8:
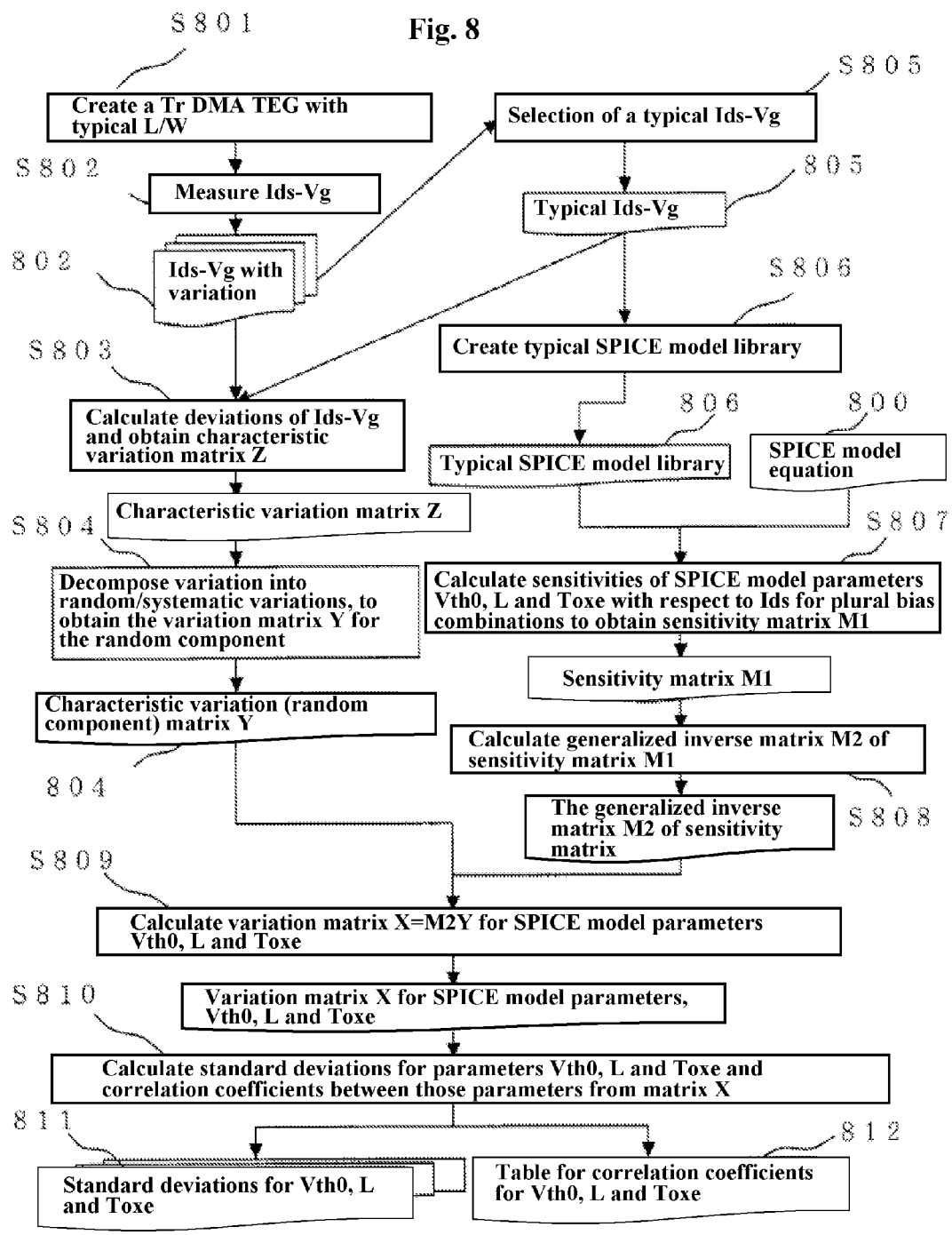
FIG. 8 shows a flow chart for a process in a preferred embodiment of the invention.
Figure 9:
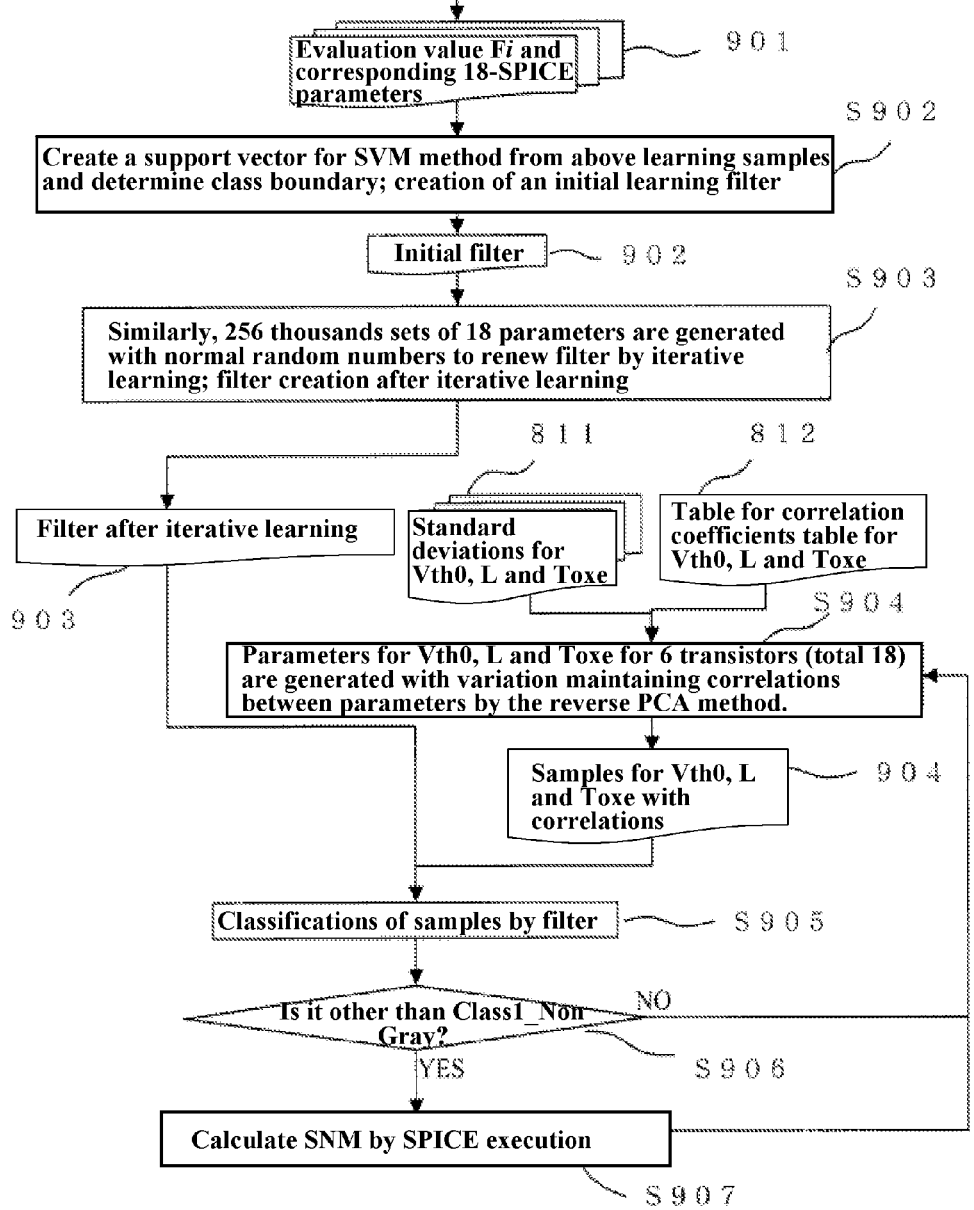
FIG. 9 shows a flow chart for a process in a preferred embodiment of the invention.

FIG. 8 and FIG. 9 are the flow charts of the process, as one of the embodiments of the present invention, of the SNM (Static Noise Margin) FBC (Fail Bit Count) simulation for the yield estimation of a SRAM consisting of 6 transistors (6T-SRAM). FIG. 8 shows a flow chart for processing and creation of the standard deviations and the correlation coefficients, while FIG. 9 shows a flow chart for the estimation process of the yields by SNM FBC simulation.

In FIG. 8, in creating the table for correlation coefficients, Device Matrix Array TEG of a single MOS transistor (Tr DMA TEG) with the gate electrode with typical length and typical width is created (step S801.) Next, characteristics of each TEG are measured (step S802.) Hereafter, explanation will be made on an example of $I_{ds}$-$V_g$ characteristics. With this step, plural $I_{ds}$-$V_g$ characteristics 802 are obtained. From those plural $I_{ds}$-$V_g$ characteristics with variations, a typical $I_{ds}$-$V_g$ characteristic is selected (step S805), the typical $I_{ds}$-$V_g$ characteristic 805 is obtained.

Next, deviations for the plural $I_{ds}$-$V_g$ characteristics are calculated to obtain characteristic variations matrix Z (step S803.) With this step, a characteristic variations matrix Z is obtained. Then, the variation is decomposed into the random variation component and the systematic variations component to obtain the variations matrix for the random component (step S804.) With this step, the variations matrix for the random component Y is obtained.

On the other hand, the typical SPICE model library is created using the typical $I_{ds}$-$V_g$ characteristic 805 (step 806.) With the typical SPICE model library 806 and the SPICE model equation 800, the sensitivities of the SPICE model parameters, $V_{th0}$ (the threshold voltage at $V_{sb}$=0), L (length of the gate electrode) and $T_{oxe}$ (gate thickness), with respect to $L_{ds}$ are calculated for plural bias conditions, to obtain the sensitivity matrix M1 (step S807.) Here the bias includes four types of bias; gate voltage $V_g$ of the transistor, drain voltage $V_d$, substrate voltage $V_b$, source voltage $V_s$. Next, the generalized inverse matrix M2 of the obtained sensitivity matrix M1 is created (step S808.)

Next, variations matrix X for the SPICE model parameters, $V_{th0}$, L and $T_{oxe}$ are calculated, which are given by X=M2·Y (step S809.) With this step, the variations matrix X for the SPICE model parameters, $V_{th0}$, L and $T_{oxe}$ are obtained. Next, the standard deviations for each model parameters $V_{th0}$, L and $T_{oxe}$ and the correlation coefficients between those are calculated from the variations matrix X (step S810.) With this step, the standard deviations 811 for each model parameters ($V_{th0}$, L and $T_{oxe}$) and the table for correlation coefficients 812 representing the correlation coefficients between the model parameters are obtained.

SNM FBC simulation is executed as shown in FIG. 9. Namely, in FIG. 9, six of the SPICE model parameters for each $V_{th0}$, L and $T_{oxe}$ are generated with uniform random numbers, and predetermined numbers of sets with variations (1000 sets in the example of FIG. 9) are created. With those parameters, SNM for the 6T-SRAM are calculated with SPICE simulation. Based on following equation, evaluation value Fi ($1 \leq i \leq 1000$) is obtained using a predetermined value of T (step S901.)

$Fi$=1, if SNMi>T, $Fi$=−1, if SNMi≤T.

With this step, 1000 pieces of learning samples 901 with the evaluation value Fi and corresponding 18 SPICE model parameters are obtained. Using the learning samples 901, support vectors of the SVM method are generated and the boundary of the class is determined. With this step, the initial filter 902 has been generated (step S902.) In a similar way, 256 thousands sets of the 18 model parameters are generated with normal random numbers, and the filter is renewed with the iterative learning. With this process, the filter after the iterative learning 903 is obtained (step S903.)

On the other hand, the model parameters $V_{th0}$, L and $T_{oxe}$ for 6 transistors, namely 18 model parameters are generated with variations, using the standard deviations 811 for the model parameters $V_{th0}$, L and $T_{oxe}$, and the table for correlation coefficients 812 for the model parameters $V_{th0}$, L and $T_{oxe}$, and adopting reverse PCA (Principal Component Analysis) method, maintaining the correlation between the model parameters. With this step, plural samples 904 having correlated model parameters $V_{th0}$, L and $T_{oxe}$ are obtained.

Next, after the classification by the filter 903 (step S905), the process will directly return to the process step S904 when the result was not other than Class 1_Non Gray (that is when Class 1_Non Gray), while return to the step S904 after re-determination of Pass or Fail by executing the SPICE and SNM calculation (step S906, S907.) This process returning from the process step S906, S907 to the process step S904, shall be executed predetermined times, for example, 256 thousand times or 8 million times. The yield is estimated by dividing the number of the samples determined as Class 1_Non Gray (Pass) in the process steps S905 and S907 by the total sample numbers. Here, the boundary of the filter shall be modified so that the evaluation results improves (that is, so that the Gray determinations reduces), based on the evaluation of Pass or Fail at the process step S907.

Figure 10:
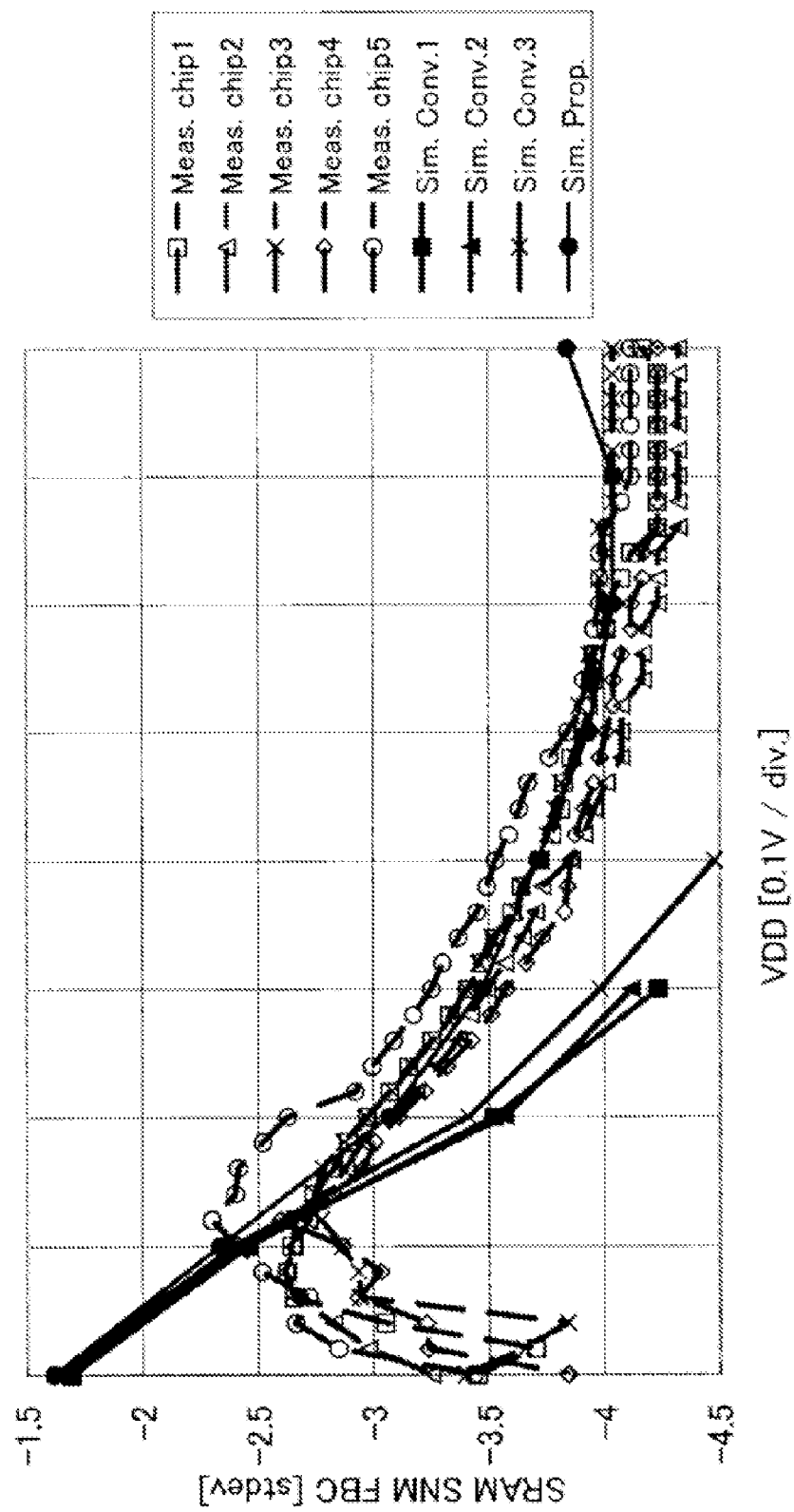
FIG. 10 shows a diagram showing estimation results of the yields in a preferred embodiment of the invention.
Figure 13:
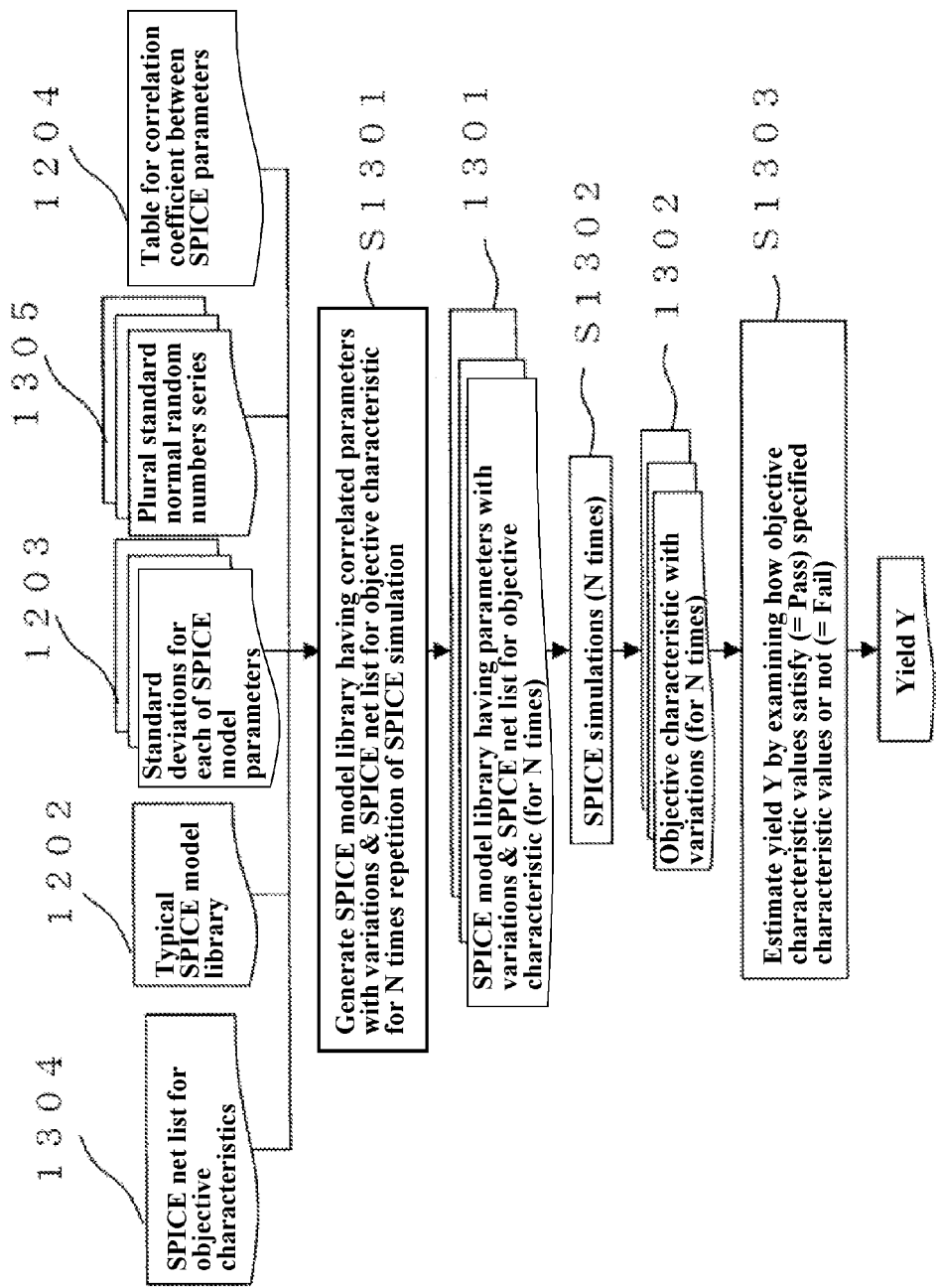
FIG. 13 shows a flow chart for a process in an example of the invention.

FIG. 10 compares the results obtained by the preferred embodiment of the present invention with those obtained by conventional examples shown in FIG. 11 to FIG. 13. Here each notation in the FIG. 10 respectively stands for as below; Meas. Chip 1~5: measured results for 5 LSI chip samples, Sim. Conv. 1: the results when only the SPICE model parameter $V_{th0}$ had the variation (conventional method), Sim. Cov. 2: the results when only SPICE model parameters $V_{th0}$, and XL had variations without correlations, Sim. Conv. 3: the results when only SPICE model parameters $V_{th0}$, XL and $T_{oxe}$ had variations without correlations (conventional method), Sim.Prop.: the results when only SPICE model parameters $V_{th0}$, XL and $T_{oxe}$ had variations with correlations (the embodiment of the present invention.)

As apparent in FIG. 10, the discrepancies are large between the measured results (Meas. Chip 1~5) and the results by conventional method (Sim. Cony. 1~3). While, the discrepancies are smaller in the preferred embodiment of the present invention than those in the conventional one. Also a speed 274 times higher measured in time has been achieved compared to the conventional method, which was confirmed by the simulation by 8 million samples, with model parameter $V_{th0}$ with variations for 6 transistors constituting the SRAM cell. Further the FBC was 4,122 samples in the present embodiment compared to 4,129 samples in the conventional method, where the discrepancy was 0.17%. This result demonstrates the small error of the present embodiment, in spite of higher speed of simulation.

As described above, following processing are executed in the system for creating parameter information, the system for estimation yields, the method for creating parameter information, the method for estimation yields of the present embodiment.

(1) The variations in the measured data of the TEGs are decomposed into random component and systematic component. Using the sensitivity matrix M1 indicating the sensitivities with respect to the physical characteristics, the standard deviations for each of the SPICE model parameters and the correlation coefficients between the model parameters are created using the measured data.

(2) The filter which learns the boundary of Pass or Fail in the SPICE model parameter space is created, where the samples determined as Pass are filtered, while the SPICE simulations and determinations are executed again for the rest of the samples. Those reduce the repetition numbers of Monte Carlo simulations and enable more accurate determination of Pass or Fail than in conventional method.

(3) In the above filtering, given samples are classified into three groups; Gray region where Pass/Gray can not be determined due to locations too close to the boundary, Pass region where the determination can be made as Pass, and Fail region where the determination can be made as Fail. By executing the SPICE simulations and determination again for the samples in Gray region and Fail region, determination on Pass or Fail becomes more accurate.

(4) The filter is realized by SVM, where the filter is characterized in that includes the initial learning step where the filter learns rough location of the boundary from a whole space of the SPICE model parameters, and the iterative learning step where the Gray region is reduced by generating samples near the boundary and by learning.

(5) In addition to creating a filter beforehand, the iterative learning steps are also executed during the Monte Carlo simulation.

Therefore, following benefits are realized by the present embodiment of the invention.

(1) The time required to create the SPICE model library in the stage 1 is reduced, because only one creation of the typical SPICE model library is required.

(2) The time to derive the standard deviations for the SPICE model parameters and the correlation coefficients between those is reduced, because the variations of the model parameters are derived by using the sensitivity matrix, instead of repeating the creation of the model library plural times as described in Sang-Hoon Lee et al., "An Efficient Statistical Analysis Methodology and Its Application to High-Density DRAMs," IEEE/ACM Proceedings of ICCAD'97, 1997, pp. 678-683, and because the standard deviations and the correlation coefficients are directly derived from the variations of each of the model parameters, instead of adopting the random guessing as done in Takeuchi, Hane "High efficiency Extraction Method of Statistical SPICE Parameter," The Japan Society of Applied Physics, Silicon Technology, No. 76, 2005, pp 41-45.

(3) The SPICE execution frequency is reduced and a high speed simulation is realized, because SPICE simulations are executed only for the samples in the Gray and Fail regions by using the Pass/Fail filter, where Pass or Fail determinations are done without executing SPICE for other samples, and because a filter having a small Gray region is constituted even when the model parameters increased. Also, in addition to realizing high speed simulation, accuracy in Pass/Fail determinations is improved because the numbers of the samples in Gray and Fail regions is very small generally and the SPICE simulations are executed again only for those samples.

(4) The accuracy for the estimation of yields is improved, because fewer model parameters are processed without taking into their variations and correlations owing to the easier derivation of the standard deviations and the correlation coefficients, and because enough large repetition number of Monte Carlo simulation can be concluded in a practical time frame owing to the fast speed of stage three in the embodiment.

Also the system for creating parameter information and the system for estimating yields according to the embodiment of the present invention can be constituted by executing the program for parameter information creation and the program for yield estimation. Also according to the embodiment of the present invention, the computer readable record medium 105 which stores the program for parameter information creation and the program for yield estimation is provided.

Next, another embodiment of the present invention including the system for creating parameter information, the system for estimating yields, the method for creating parameter information, the method for estimating yields, the program for parameter information creation and the program for yield estimation is described below. The block diagram for this another embodiment is same as FIG. 1. Also the processes shown in FIG. 2 to FIG. 9 are same as those shown in the first embodiment, except for some differences described below. In another embodiment, the estimation part 113 adopts importance sampling method which is a method that accelerates Monte Carlo method in order to estimate the yield.

Figure 14:
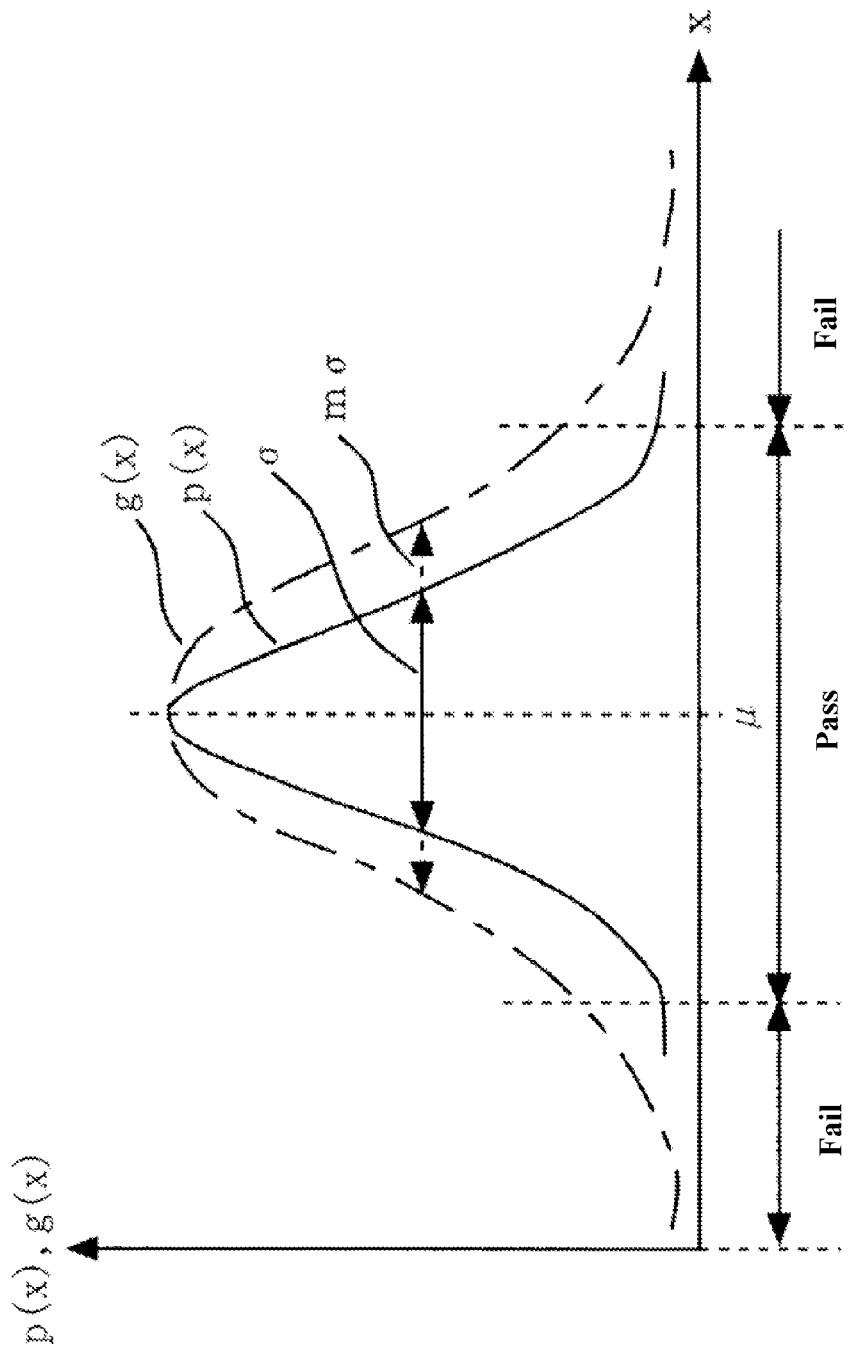
FIG. 14 shows another preferred embodiment of the invention.

FIG. 14 explains operation principle of another preferred embodiment of the invention. In FIG. 14, probability density functions p(x), g(x) are shown as functions of variation parameter x. The probability density function p(x) is a normalized variation function with average μ and standard deviation σ, while the probability density function g(x) is a normalized variation function with average μ and standard deviation mσ (1<m) for example, m=1.5.) Here arbitrary m value for the probability density functions g(x) may be selected, so far as it generates enough failure samples.

The estimation part 113 in FIG. 4, creates a model library for simulation with variations and correlation using the importance sampling method which is a kind of accelerating method of Monte Carlo method, in the process step S401 (the process step S501 in FIG. 5, in detail.) Also the estimation part 113, in the process step S403, estimates the yields when determining whether the samples with the objective characteristics with variations satisfy the specification or not (Pass or Fail), by removing the influence of the weighting in the importance sampling method.

In other words, in FIG. 14, estimation part 113, in estimating yield $P_f$ by Monte Carlo method, when samples are generated by the density variation function p(x), executes following process using the density probability function g(x) generating as much as failure samples. At first, the estimating part 113, generates sample series $x_j$ for sample x with the density variation function g(x), using random numbers in the process steps S401 and S501.

Then, the estimation part 113, in a same way as the previous embodiment, determines Pass or Fail of the samples x. Next, the estimation part 113, estimates yield $P_f$, using equation (6) below, by dividing the number of the samples determined as Pass (the total sample number minus the sample number determined as Fail) by the total sample number $N_{IS}$ (step S403.) In other words, the estimation part 113, after making determinations for Pass or Fail which represents whether the samples with plural objective characteristics with variations satisfy (Pass) the predetermined specifications or not (Fail), estimates the yield $P_f$ to eliminate the influence of the weighting used in the importance sampling method, by using equation (6). With this step, normal yield $P_f$ for the probability density function p(x) is obtained.

$$P_f = \frac{N_{IS} - \sum_{i=1}^{N_{IS}} y(x_i)}{N_{IS}} \quad (6)$$

whereas, following relations are assumed for weighted performance index y(x) and weighting function w(x), and performance index I(x), $$y(x) = w(x) \cdot I(x), \ w(x) = p(x)/g(x)$$

$$\text{Performance index } I(x) = \begin{cases} 0, & \text{pass } (f(x) < f_0; x \in R^n) \\ 1, & \text{fail } (f(x) > f_0; x \in R^n) \end{cases}$$

As described above, in the another preferred embodiment of the present invention, the means for creating the simulation information generates random numbers corresponding to the correlation coefficient data between the simulation model parameters, and further creates the simulation model library having correlated model parameters with variations, and the simulation net list for the objective characteristics, by importance sampling method using the random numbers, the typical simulation model library, the standard deviations for the plural simulation model parameters and the simulation net list for the typical objective characteristic, and the means for estimation makes decision of Pass or Fail which represents whether a sample satisfies the predetermined specification or not, for the samples having plural objective characteristics with variations and correlations, and obtained by plural executions of the means for creating simulation information and the means for making simulations, and then estimates yields by removing the influence of the weighting in the importance sampling method, used in the means for creating simulation information.

As shown above, another preferred embodiment of the present invention has an effect that the yield can be estimated in high speed, in addition to the preferred embodiment, since the yields are calculated by using importance sampling method. In all above explanations, the present invention was explained for the examples of SPICE simulation. However, the present invention can be applied to other simulations.

POSSIBLE INDUSTRIAL APPLICATIONS

The present invention can be used in creating parameter information used in variation analysis in the fields such as electronic circuit analysis, structure analysis in architecture field and material analysis. It can also be applied for the yield analysis in those fields.

What is claimed is:

1. A system for creating parameter information, comprising:

means for creating random characteristic variation data, the means for creating random characteristic variation data calculating variations of plural physical characteristics stored in memory means, decomposing the variations into random variations corresponding to a random variation component of the physical characteristics, and into systematic variations corresponding to a systematic variation component of the physical characteristics, and creating random characteristic variation data representing the random variations;

means for creating sensitivity data, the means for creating sensitivity data creating sensitivity data of simulation model parameters with respect to the physical characteristics, from a simulation model library and simulation model equations;

means for creating variation data, the means for creating variation data creating variation data of simulation model parameters, by dividing the random characteristic variation data by the sensitivity data; and means for creating parameter data, the means for creating parameter data calculating standard deviations for the simulation model parameters and correlation coefficients between the simulation model parameters, from the variation data of the simulation model parameters.

2. A system for estimating yields comprising:

means for storing a simulation model library, standard deviations for a plurality of simulation model parameters, correlation coefficient data for the simulation model parameters and a simulation net list for an objective characteristic;

means for creating simulation information, the means for creating simulation information generating random numbers corresponding to the correlation coefficient data for the simulation model parameters, and creating a simulation model library having correlated model parameters with variations, and the simulation net list for the objective characteristic, by Monte Carlo method using the random numbers, the simulation model library, the standard deviations for the plural simulation model parameters and the simulation net list for an objective characteristic;

means for simulations, the means for simulations obtaining samples having the objective characteristic with variations, by performing simulations using the simulation model library and the simulation net list for the objective characteristic created by the means for creating simulation information;

means for estimations, the means for estimations estimates the yields by determining whether a predetermined specification is satisfied (=Pass) or not (=Fail) for samples having plural objective characteristic values with variations, wherein the samples being obtained by plural executions of the means for creating simulation information and the means for simulations, wherein the means for estimations includes a filter which learns a boundary for decisions of Pass or Fail, in addition to the decisions of Pass or Fail, and repeats the determination by performing the simulations again for the samples on which the filter did not determine as Pass; and further comprising a system for creating parameter information comprising:

means for creating random characteristic variation data, the means for creating random characteristic variation data calculating variations of plural physical characteristics stored in memory means, decomposing the variations into random variations corresponding to a random variation component of the physical characteristics, and into systematic variations corresponding to a systematic variation component, and creating random characteristic variation data representing the random variations;

means for creating sensitivity data, the means for creating sensitivity data creating sensitivity data of simulation model parameters with respect to the physical characteristics, from a simulation model library and simulation model equations;

means for creating variation data, the means for creating variation data creating variation data of simulation model parameters, by dividing the random characteristic variation data by the sensitivity data; and means for creating parameter data, the means for creating parameter data calculating standard deviations for the simulation model parameters and correlation coefficients between the simulation model parameters, from the variation data of the simulation model parameters.

3. The system for estimating yields according to claim 2, wherein the means for creating simulation information generating random numbers corresponding to the correlation coefficient data for the simulation model parameters, and further creating the simulation model library having correlated model parameters with variations, and the simulation net list for the objective characteristic, by importance sampling method using the random numbers, the simulation model library, the standard deviations for the plural simulation model parameters and the simulation net list for the objective characteristic, and wherein the means for estimation determining Pass or Fail which represents whether samples satisfy the predetermined specification or not, for the samples having plural objective characteristics values with variations, and estimating yields by removing an influence of weighting in the importance sampling method used in the means for creating simulation information, wherein the samples being obtained by plural executions of the means for creating simulation information and the means for simulations.

4. A computer executable method for creating parameter information, the method comprising:

creating random characteristic variation data with the computer, the creating random characteristic variation data including calculating variations of plural physical characteristics stored in memory means, decomposing the variations into random variations corresponding to a random variation component of the physical characteristics, and into systematic variations corresponding to a systematic variation component, and creating random characteristic variation data representing the random variations;

creating sensitivity data, the creating sensitivity data including creating sensitivity data of simulation model parameters with respect to the physical characteristics, from a simulation model library and simulation model equations;

creating variation data, the creating variation data including creating variation data of simulation model parameters, by dividing the random characteristic variation data by the sensitivity data; and creating parameter data, the creating parameter data including calculating standard deviations for the simulation model parameters and correlation coefficients between the simulation model parameters, from the variation data of the simulation model parameters.

5. A non-transitory computer readable recording medium storing a program that, when executed, causes a computer to execute the method for creating parameter information according to claim 4.

6. A system for creating parameter information, comprising:

a processor coupled to a memory, wherein the processor comprises a random characteristic variation data creator configured to calculate variations of plural physical characteristics stored in the memory, decompose the variations into random variations corresponding to a random variation component of the physical characteristics and into systematic variations corresponding to a systematic variation component, and create random characteristic variation data representing the random variations;

a sensitivity data creator configured to create sensitivity data of simulation model parameters with respect to the physical characteristics, from a simulation model library and simulation model equations;

a variation data creator configured to create variation data of simulation model parameters, by dividing the random characteristic variation data by the sensitivity data; and a parameter data creator configured to calculate standard deviations for the simulation model parameters and correlation coefficients between the simulation model parameters, from the variation data of the simulation model parameters.

* * * * *